(12) United States Patent
Yamamoto

(10) Patent No.: US 7,576,840 B2
(45) Date of Patent: Aug. 18, 2009

(54) BRILLOUIN SPECTRAL MEASURING METHOD AND BRILLOUIN SPECTRAL MEASURING APPARATUS

(75) Inventor: Yoshinori Yamamoto, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 149 days.

(21) Appl. No.: 11/913,244

(22) PCT Filed: Apr. 16, 2007

(86) PCT No.: PCT/JP2007/058266

§ 371 (c)(1), (2), (4) Date: Oct. 31, 2007

(87) PCT Pub. No.: WO2007/123080

PCT Pub. Date: Nov. 1, 2007

(65) Prior Publication Data

US 2009/0079961 A1    Mar. 26, 2009

(30) Foreign Application Priority Data

Apr. 21, 2006   (JP) .............................. 2006-118228

(51) Int. Cl.
*G01L 1/24* (2006.01)
*G01N 21/00* (2006.01)
*G01B 9/02* (2006.01)
*G02B 6/00* (2006.01)

(52) U.S. Cl. .................... 356/35.5; 356/73.1; 356/477; 385/12

(58) Field of Classification Search ................ 356/35.5, 356/73.1, 477; 385/12
See application file for complete search history.

(56) References Cited

U.S. PATENT DOCUMENTS 5,592,577 A    1/1997    Tanoue (Continued)

FOREIGN PATENT DOCUMENTS

JP         08-125607       5/1996

(Continued)

OTHER PUBLICATIONS

Nikles et al., "Brillouin Gain Spectrum Characterization in Single-Mode Optical Fibers", Journal of Lightwave Technology, Oct. 1997, p. 1842-1851, vol. 15, No. 10.

(Continued)

Primary Examiner—Patrick J Connolly
(74) Attorney, Agent, or Firm—Global IP Counselors, LLP

(57) ABSTRACT

The present invention relates to a Brillouin spectrum measuring method and measuring apparatus that have a structure for more accurately measuring the parameters of Brillouin spectra at predetermined sections of an optical fiber. The measuring method comprises an optical fiber section including first and second optical fibers that are serially connected via a connection portion. The first and second optical fibers have a Brillouin spectrum for which the difference between the peak frequencies in a predetermined temperature and predetermined strain-applied state for which the respective usage environments are assumed is equal to or more than a predetermined frequency difference. In the measuring method, a Brillouin spectrum which is obtained in accordance with pumping light supplied to the optical fiber section is measured, and a point of connection between the first and second optical fibers is specified on the basis of the measurement data for the measured Brillouin spectrum.

11 Claims, 20 Drawing Sheets

U.S. PATENT DOCUMENTS

| | | | |
|---|---|---|---|
| 7,283,216 B1 * | 10/2007 | Geng et al. | 356/35.5 |
| 2004/0206893 A1 | 10/2004 | Sato | |
| 2005/0207752 A1 * | 9/2005 | Kwon et al. | 398/25 |
| 2006/0109451 A1 * | 5/2006 | Lopez Torres et al. | 356/73.1 |
| 2008/0013096 A1 * | 1/2008 | Bernini et al. | 356/483 |
| 2008/0068586 A1 * | 3/2008 | Kishida et al. | 356/32 |
| 2008/0193126 A1 * | 8/2008 | Yamamoto | 398/34 |

FOREIGN PATENT DOCUMENTS

| | | |
|---|---|---|
| JP | 11-142293 | 5/1999 |
| JP | 11-287670 | 10/1999 |
| JP | 2004-317436 | 11/2004 |

OTHER PUBLICATIONS

L. Thevenaz et al., "Brillouin gain spectrum characterization in optical fibres from 1 to 1000 K", OFS-16, Tu2-2, p. 38-41, 2003.

Kazuo Hotate et al., "Measurement of Brillouin Gain Spectrum Distribution along an Optical Fiber Using a Correlation-Based Technique-Proposal, Experiment amd Simulation-", IEICE Trans Electron, Mar. 2000, p. 405-412, vol. E83-C. No. 3.

* cited by examiner

Fig.2
(a)
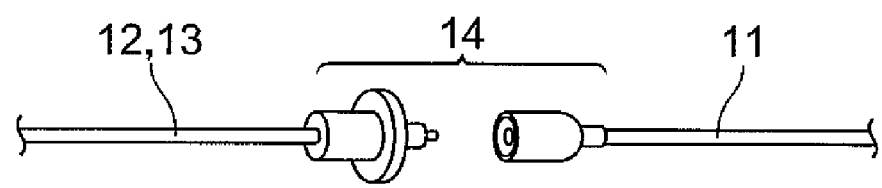
(b)
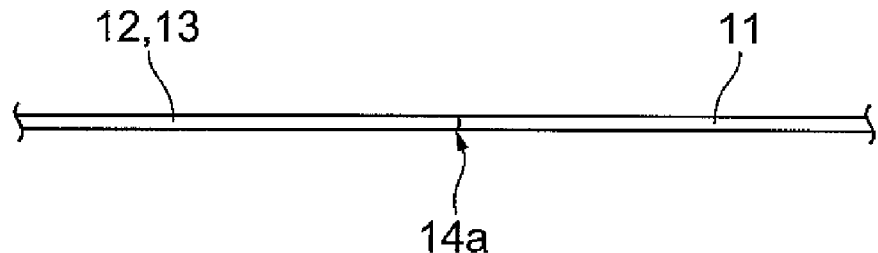
(c)
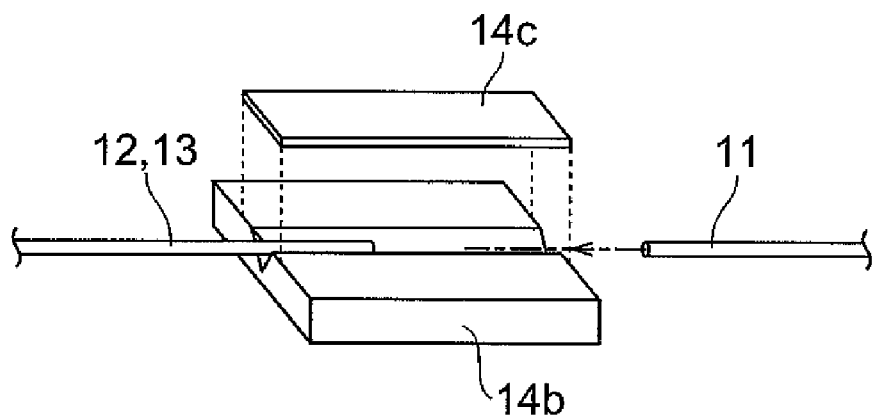

*Fig.4*

| CONNECTING OPTICAL FIBER 12, 13 | CORE Δ (%) | TEMPERATURE COEFFICIENT OF FREQUENCY SHIFT @77k (MHz/K) | TEMPERATURE COEFFICIENT OF FREQUENCY SHIFT @300k (MHz/K) |
|---|---|---|---|
| SAMPLE 1 | 0 | 0.60 | 1.40 |
| SAMPLE 2 | 0.80 | 0.17 | 1.20 |
| SAMPLE 3 | 2.7 | 0 | 0.74 |

Fig.14
(a)
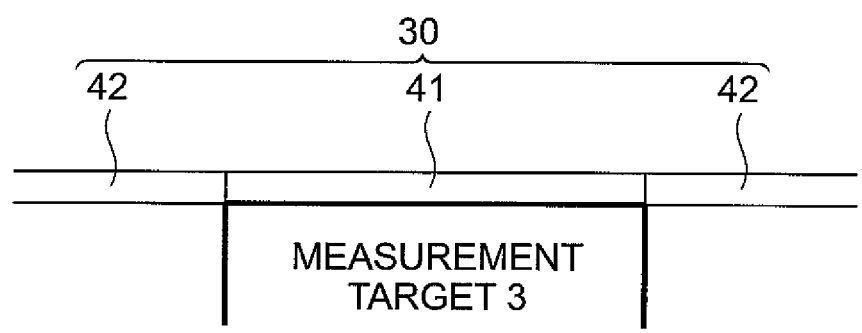
(b)
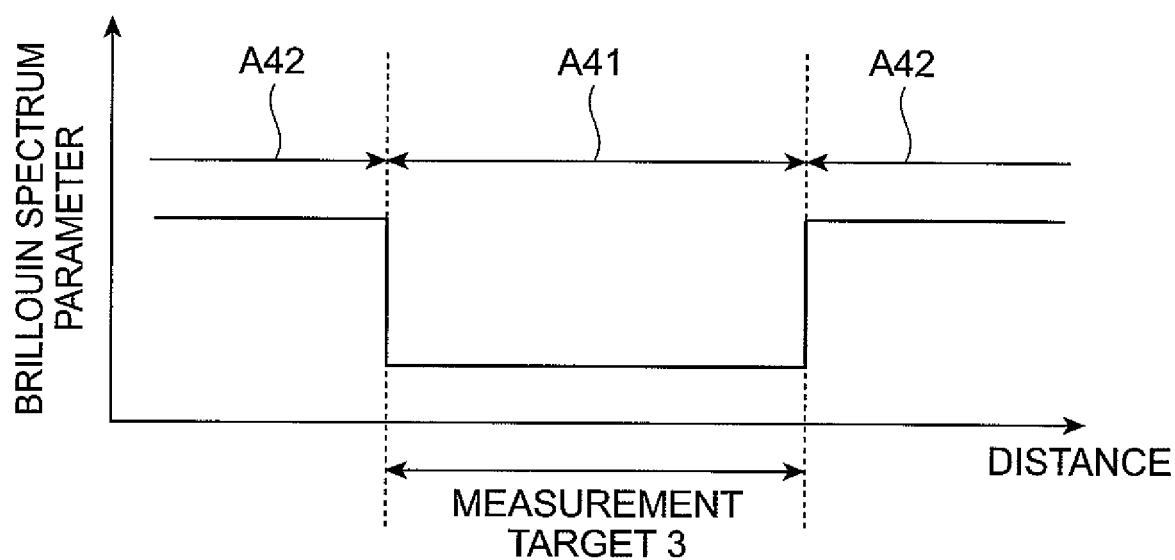

Fig.15
(a)
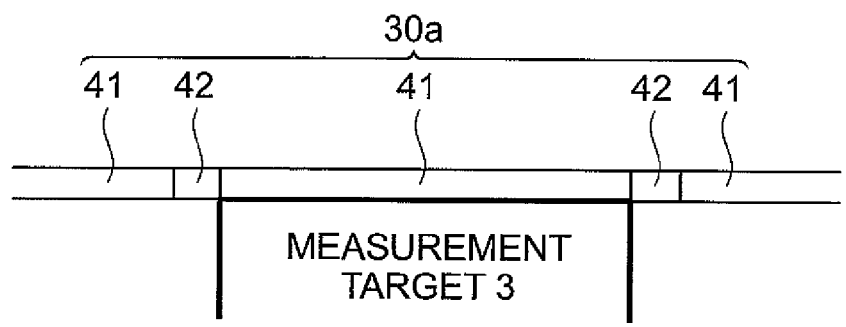
(b)
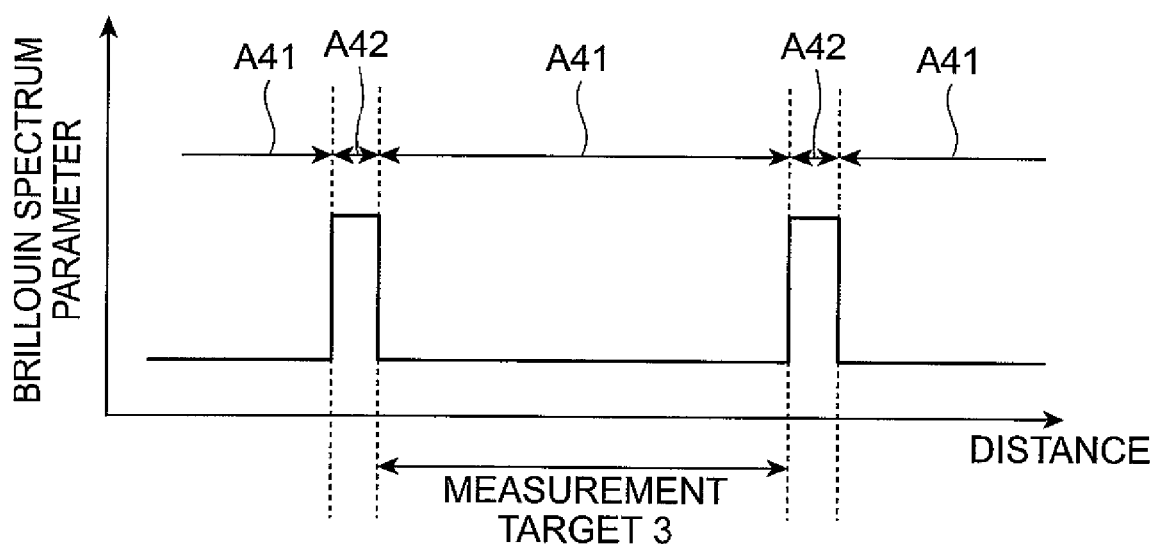

Fig.16
(a)
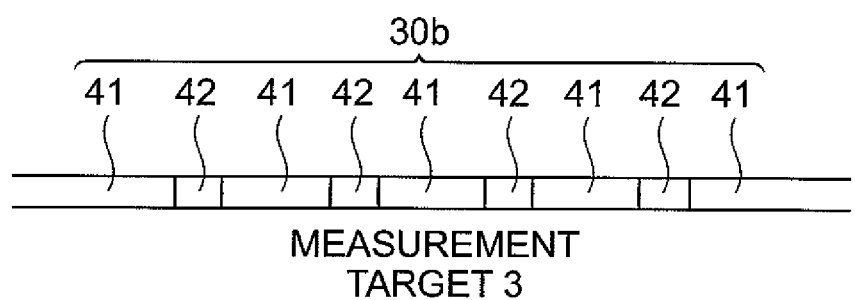
(b)
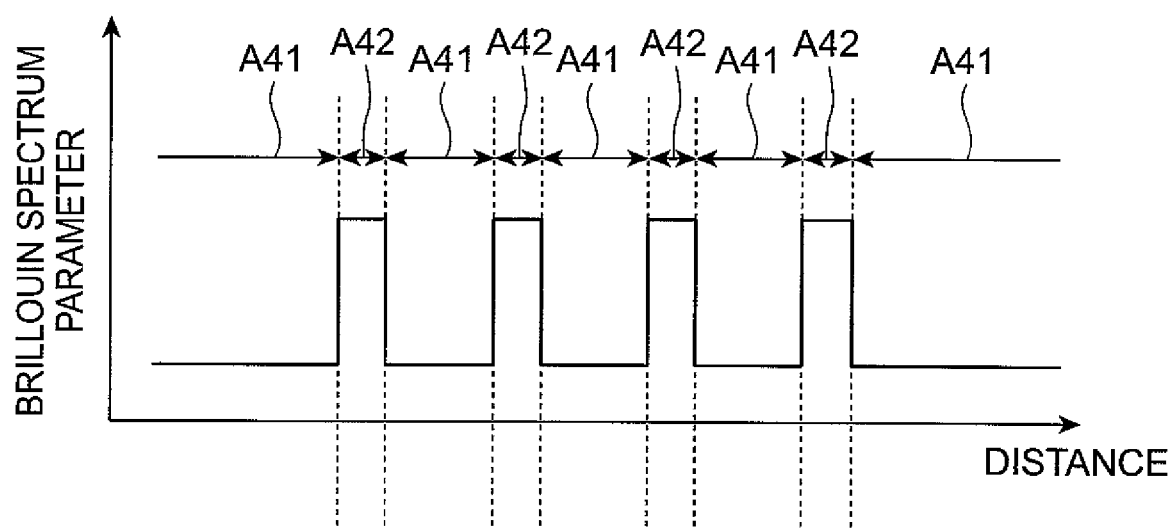

Fig.17
(a)
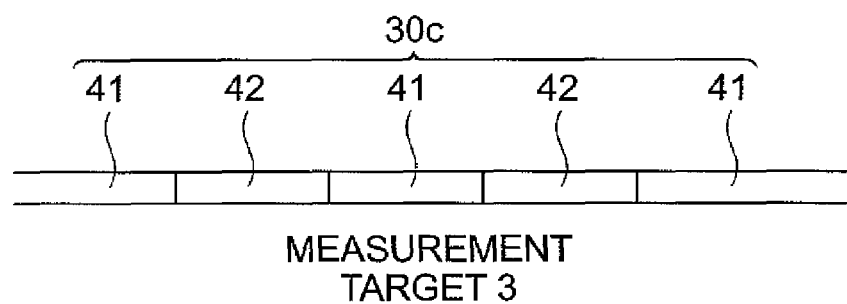
(b)
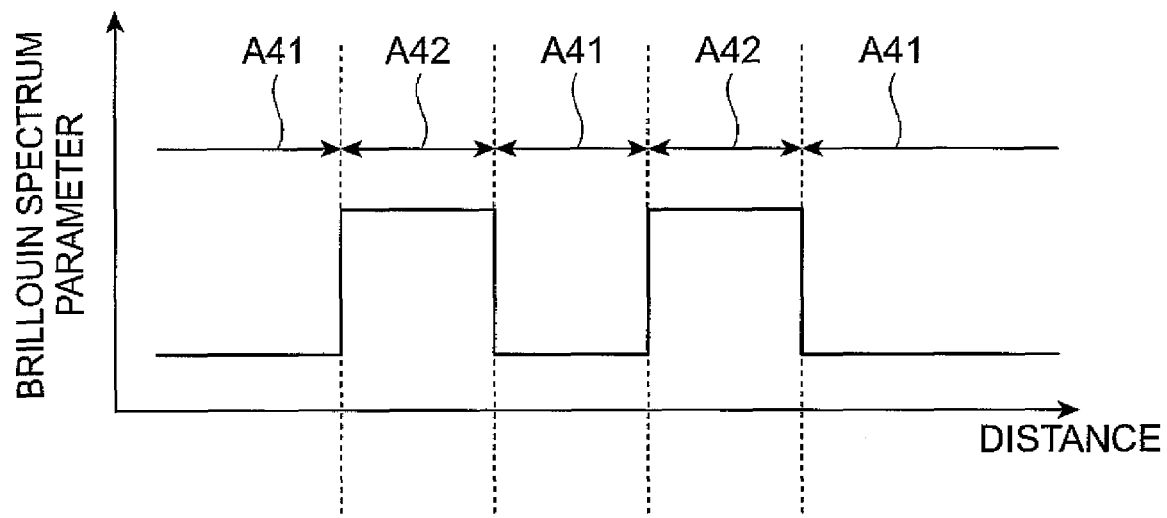

*Fig.18*
(a)
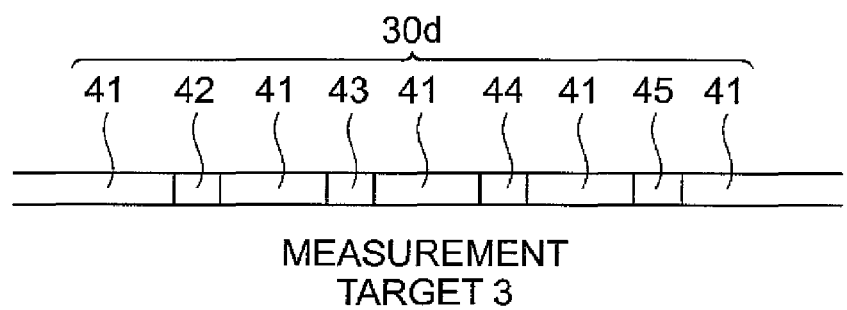
MEASUREMENT TARGET 3
(b)
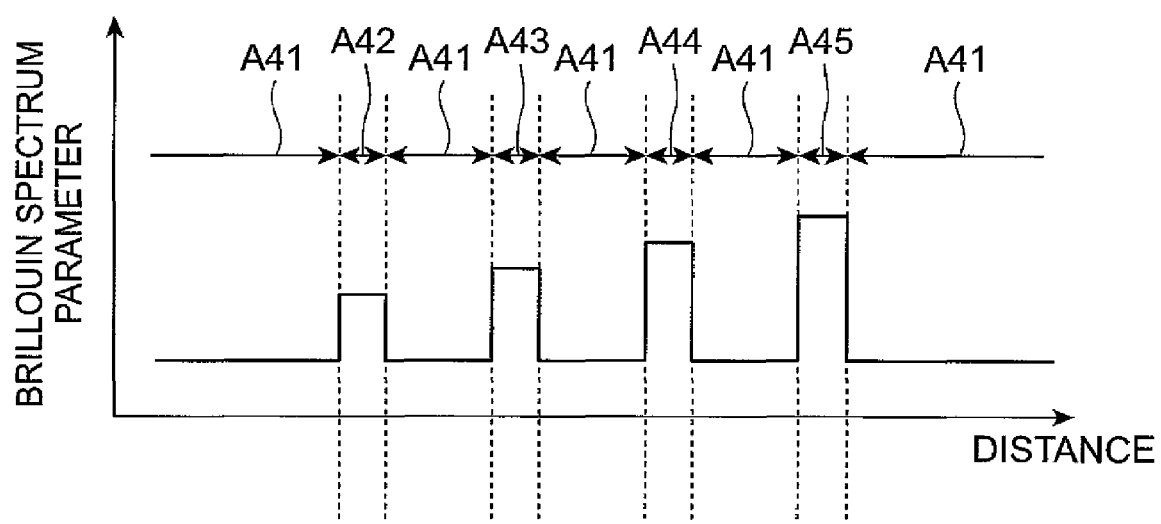

Fig.19
(a)
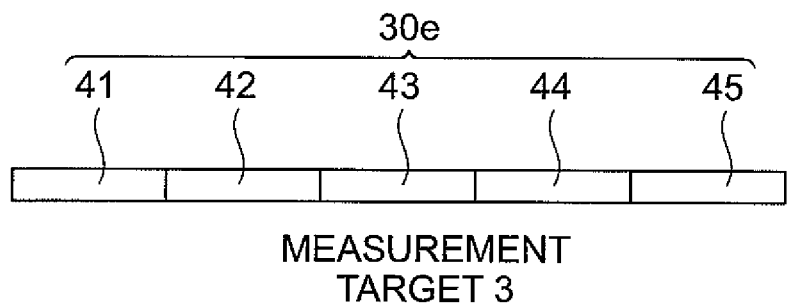
(b)
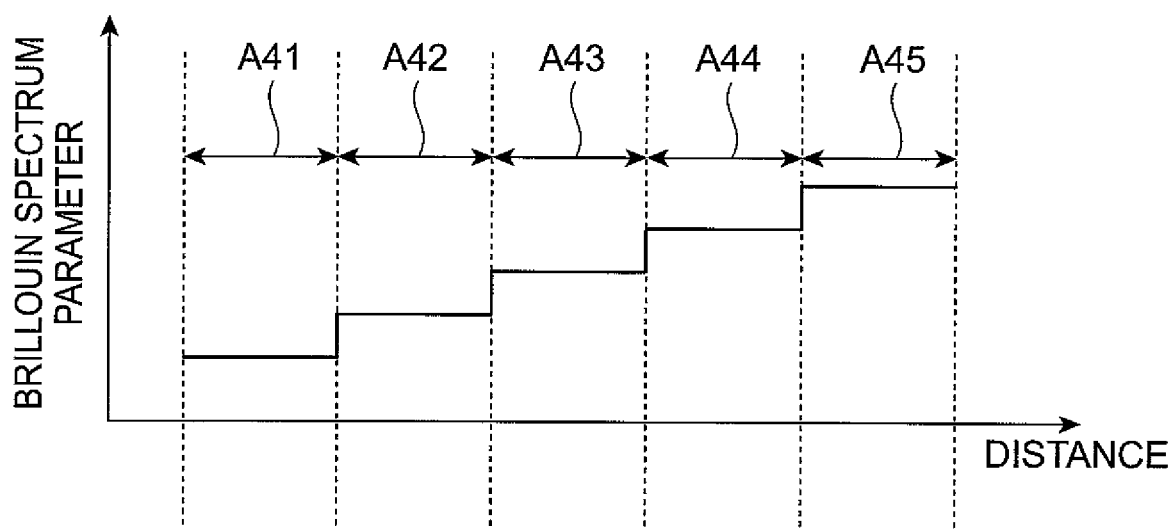

Fig.20
(a)
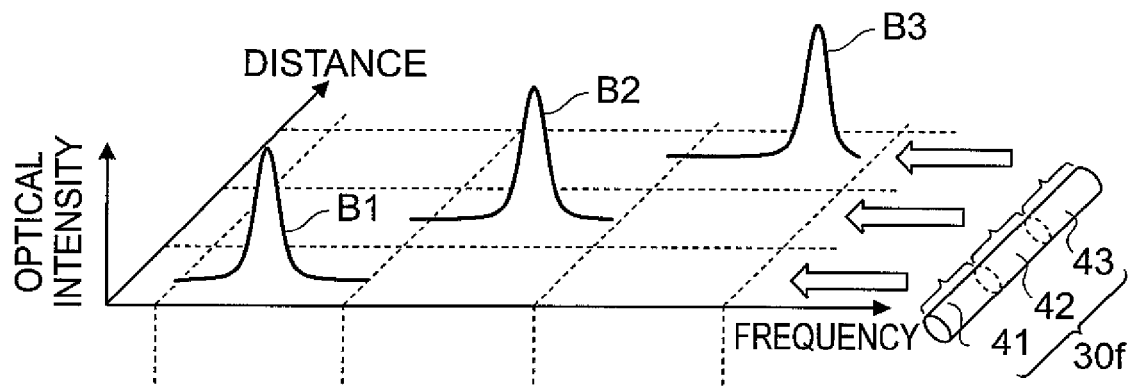
(b)
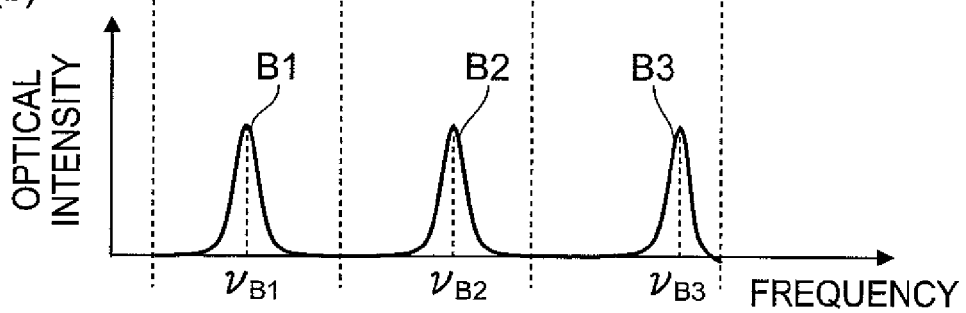
(c)
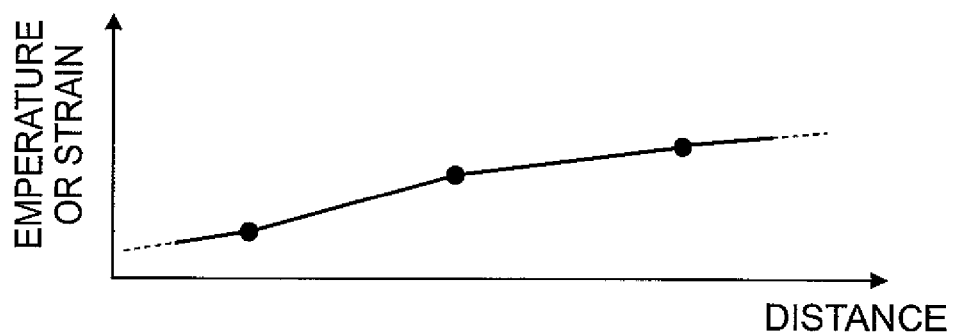

BRILLOUIN SPECTRAL MEASURING METHOD AND BRILLOUIN SPECTRAL MEASURING APPARATUS

TECHNICAL FIELD

The present invention relates to a Brillouin spectral measuring method and Brillouin spectral measuring apparatus.

BACKGROUND ART

A technology that measures a Brillouin scattered light spectrum that are generated in accordance with a pumping light input that is obtained from an optical fiber placed in the vicinity of a measurement object and measures the temperature and strain of the optical fiber as a physical change in the measurement object on the basis of the parameters of the measured Brillouin spectral is known (See Non-Patent Document 1).

However, in the technology mentioned in Non-Patent Document 1, when an optical fiber of the same type is applied in a measurement area and in another area (a non-measurement area), the respective Brillouin spectra overlap and accurate Brillouin spectrum measurement of the measurement area is not possible. There is also the problem that it is hard to know of the position of the measurement object.

In response to this problem, for example, Patent Document 1 mentions a technology that discriminates a measurement area and non-measurement area by connecting a wavelength 1.3 µm optical fiber to a wavelength 1.55 µm optical fiber while pasting the optical fiber with a wavelength of 1.55 µm onto the measurement area and measuring the spectrum of the Brillouin scattered light output by these optical fibers of two types.

Patent Document 1: Japanese Patent Application Laid-Open No. H11-287670

Non-Patent Document 1: Nikles, et al., 'Brillouin Gain Spectrum Characterization in Single-Mode Optical Fibers', Journal of Lightwave Technology, October 1997, vol. 15, no. 10, pages 1842 to 1851

DISCLOSURE OF THE INVENTION

Problem to be Solved by the Invention

The inventors have studied conventional measurement technologies in detail, and as a result, have found problems as follows. That is, in the technology that appears in Patent Document 1, there are cases where the Brillouin spectrum of an optical fiber that is pasted onto the measurement area and the Brillouin spectrum of another optical fiber that is located in the non-measurement area overlap one another and the parameters of the respective Brillouin spectra cannot be identified. In this case, the temperature and strain of the measurement area cannot be accurately measured. In addition, the measurement area cannot be clearly discriminated.

In order to overcome the above-mentioned problems, it is an object of the present invention to provide a Brillouin spectrum measuring method and Brillouin spectrum measuring apparatus that have a structure that serves to permit accurate measurement of the parameters of the Brillouin spectra of predetermined segments of an optical fiber and to allow the position of the measurement target to be accurately grasped.

Means for Solving Problem

The Brillouin spectrum measuring method according to the present invention is able to perform highly accurate measurement of a physical amount relating to a measurement target, by utilizing a Brillouin spectrum as a spectrum of Brillouin scattered light that is generated in accordance with an input of pumping light with a predetermined wavelength from inside an optical fiber that is installed in the vicinity of the measurement target. More specifically, the measuring method signifies optical fiber that functions as a sensor for measuring a physical amount such as the temperature and strain and so forth of the measurement target. The optical fiber section includes a first optical fiber and a second optical fiber for which the difference between the peak frequencies of the Brillouin spectra obtained in a predetermined temperature and predetermined strain-applied state for which the respective usage environments are assumed is equal to or more than a predetermined frequency difference, and the first and second optical fibers are serially connected via a connection portion. The measuring method also involves measuring the Brillouin spectrum which is obtained in accordance with pumping light that is supplied to the optical fiber section and detecting the point of connection between the first and second optical fibers on the basis of measurement data for the measured Brillouin spectrum. A predetermined strain-applied state signifies a state where strain is applied to the optical fiber and the strain that is applied in this specification (the applied strain) is given by a numerical value that displays the degree of change in the length of the fiber when the two ends of the optical fiber are pulled on percentage.

Additionally, in the Brillouin spectrum measuring method according to the present invention, the first and second optical fibers preferably have Brillouin spectra in which the line width parts of the peaks of the Brillouin spectra do not overlap one another in a predetermined temperature range and in a predetermined strain-applied state for which the respective usage environments are assumed. In other words, the difference between the peak frequency of the Brillouin spectrum obtained from the first optical fiber and the peak frequency of the Brillouin spectrum obtained from the second optical fiber is equal to or more than the line widths of the respective Brillouin spectra. Thus, because there is no overlap between the Brillouin spectrum of the first optical fiber and the Brillouin spectrum of the second optical fiber, the respective Brillouin spectra can be accurately discriminated using this measuring method. In addition, the parameters of the respective Brillouin spectra can be accurately measured. The parameters of the Brillouin spectra include the spectrum peak frequency, the line width of the spectrum peak, the value of the spectrum peak, and the frequency range between adjacent spectrum peaks, and so forth, for example.

In the Brillouin spectrum measuring method according to the present invention, the first and second optical fibers may also be mechanically connected, or fusion-spliced. More specifically, mechanical connections include a constitution in which the first and second optical fibers are optically connected via a connector and a constitution where there is a butted connection on a substrate with a V-shaped groove, for example.

In the Brillouin spectrum measuring method according to the present invention, the connection portion between the first and second optical fibers is installed at the boundary between a measurement area of the measurement target and a non-measurement area other than the measurement area. The measuring method is able to clearly confirm, based on measurement data, the measurement area of the measurement target where the parameter of the Brillouin spectrum of the first optical fiber that corresponds with the measurement area of the measurement target and the parameter of the Brillouin spectrum of the second optical fiber can be accurately discriminated (that is, where the Brillouin spectrum corresponding with the measurement area of the measurement target and the Brillouin spectrum corresponding with the non-measurement area can be discriminated).

In the Brillouin spectrum measuring method according to the present invention, the one optical fiber of the first and second optical fibers which is installed in the non-measurement area preferably comprises optical fiber with a low Brillouin spectrum sensitivity with respect to strain or temperature. The effects of temperature fluctuations or strain in the non-measurement area are not readily mirrored in the measurement data with this constitution.

Furthermore, in the Brillouin spectrum measuring method according to the present invention, at least one of the first and second optical fibers may include a plurality of optical fiber elements and the optical fiber section may also have a structure in which optical fiber elements which belong to the first optical fiber and optical fiber elements which belong to the second optical fiber are disposed alternately. In this case, the points of connection between the optical fiber elements which belong to the first optical fiber and the optical fiber elements which belong to the second optical fiber, which are located in the optical fiber section, function as markers in the Brillouin spectrum measurement.

The Brillouin spectrum measuring apparatus according to the present invention measures a physical amount relating to a measurement target, by utilizing a Brillouin spectrum which is a spectrum of Brillouin scattered light that is generated in accordance with an input of pumping light of a predetermined wavelength from inside an optical fiber that is installed in the vicinity of the measurement target. More specifically, the measuring apparatus comprises an optical fiber section, a detection section, and a measurement section. The optical fiber section includes a first optical fiber and a second optical fiber that is serially connected to the first optical fiber via a connection portion. Either one of the first and second optical fibers is installed in the vicinity of the measurement target as a result of being pasted, or the like, to the measurement target, while the other optical fiber is installed in the non-measurement area of the measurement target. This constitution makes it possible to accurately discriminate the parameter of the Brillouin spectrum of the first optical fiber and the parameter of the Brillouin spectrum of the second optical fiber and allows Brillouin spectra which correspond to respective positions in the measurement target segment to be discriminated.

In addition, the detection means detects, while supplying pumping light for obtaining a Brillouin spectrum to the optical fiber section, a Brillouin spectrum that is obtained from the optical fiber section in accordance with the supply of pumping light. Further, the position measurement section specifies the position of the connection portion between the first and second optical fibers on the basis of the Brillouin spectrum thus detected.

In the Brillouin spectrum measuring apparatus according to the present invention, the connection portion preferably comprises a connection mechanism for mechanically connecting the first and second optical fibers such as, for example, a connector or a V-shaped groove substrate. In addition, the first and second optical fibers have Brillouin spectra of mutually different peak frequencies. As a result of this constitution, the measurement area of the measurement target can be clearly confirmed based on the measurement data. In order to clearly distinguish the measurement area and non-measurement area of the measurement target, the first optical fiber preferably comprises a pure silica core optical fiber and the second optical fiber preferably comprises optical fiber the core of which has a relative refractive index difference of 0.083% or more with respect to pure silica.

The Brillouin spectrum measuring apparatus according to the present invention may also further comprise a calculation section that calculates the temperature distribution or strain distribution of the measurement target on the basis of the detected Brillouin spectrum. As a result of this constitution, the temperature distribution or strain distribution can be measured using simpler measurement even when technology such as BOTDR (Brillouin Optical Time Domain Reflectrometry), BOTDA (Brillouin Optical Time Domain Analysis) or BOCDA (Brillouin Optical Correlation Domain Analysis) or the like is not used.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the scope of the invention will be apparent to those skilled in the art from this detailed description.

Effect of the Invention

In accordance with the present invention, it becomes possible to accurately measure the parameters of the Brillouin spectra of predetermined segments of an optical fiber.

BRIEF DESCRIPTION OF THE DRAWINGS

FIG. 2 shows specific embodiments of a connection portion between the first and second optical fibers;

FIG. 4 is a table that brings together various elements of a variety of samples that are prepared for the first optical fiber (connecting optical fiber);

FIG. 14 serves to illustrate the structure of the optical fiber section that is applied to the Brillouin spectrum measuring apparatus according to the second embodiment;

FIG. 15 serves to illustrate the structure of the optical fiber section that is applied to a first modified example of the Brillouin spectrum measuring apparatus according to the second embodiment;

FIG. 16 serves to illustrate the structure of the optical fiber section that is applied to a second modified example of the Brillouin spectrum measuring apparatus according to the second embodiment;

FIG. 17 serves to illustrate the structure of the optical fiber section that is applied to a third modified example of the Brillouin spectrum measuring apparatus according to the second embodiment;

FIG. 18 serves to illustrate the structure of the optical fiber section that is applied to a fourth modified example of the Brillouin spectrum measuring apparatus according to the second embodiment;

FIG. 19 serves to illustrate the structure of the optical fiber section that is applied to a fifth modified example of the Brillouin spectrum measuring apparatus according to the second embodiment; and FIG. 20 serves to illustrate the structure of the optical fiber section that is applied to a third embodiment of the Brillouin spectrum measuring apparatus according to the present invention.

Figure 1:
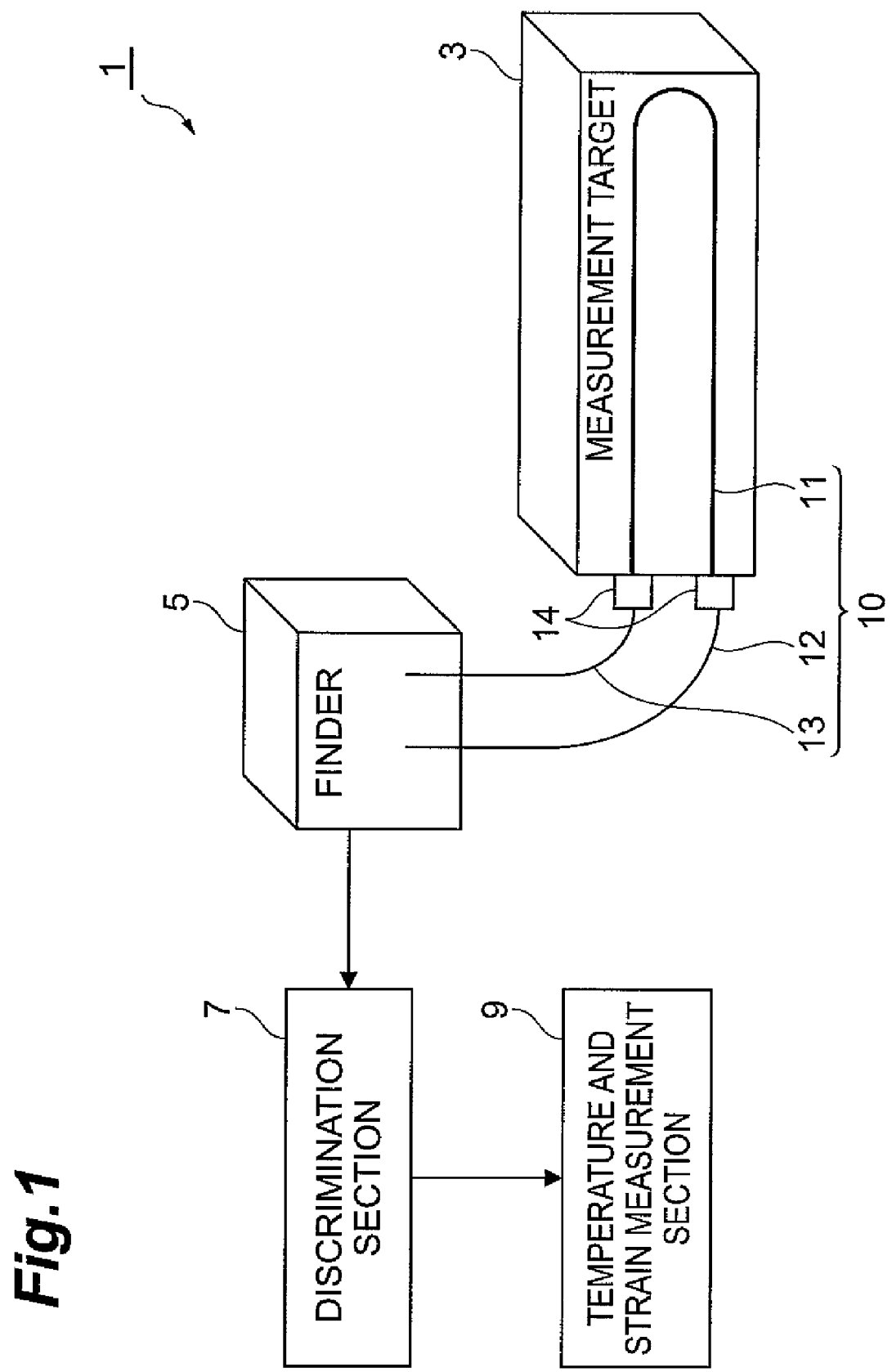
FIG. 1 shows the constitution of the first embodiment of Brillouin spectrum measuring apparatus according to the present invention.

DESCRIPTION OF THE REFERENCE NUMERALS 1, 1a, 2 . . . Brillouin spectrum measuring apparatus; 5, 5a . . . finder; 7 . . . discrimination section; 9 . . . temperature and strain measurement section; 10, 10a . . . optical fiber section; 11 . . . sensing fiber; 12, 13 . . . connecting fibers; 25 . . . finder; 27 . . . discrimination section; 29 . . . distribution measurement section; 30, 30a to 30f . . . optical fiber section; and 41 to 45 . . . first to fifth optical fibers.

BEST MODES FOR CARRYING OUT THE INVENTION

In the following, embodiments of the Brillouin spectrum measuring method according to the present invention will be explained in detail with reference to FIGS. 1 to 20. In the explanation of the drawings, constituents identical to each other will be referred to with numerals identical to each other without repeating their overlapping descriptions.

First Embodiment

FIG. 1 shows the constitution of the first embodiment of the Brillouin spectrum measuring apparatus according to the present invention. The Brillouin spectrum measuring apparatus 1 according to the first embodiment is an apparatus that comprises a finder (detection means) 5, an apparatus discrimination section 7, a temperature and strain measurement section (temperature measurement means, strain measurement means) 9, which constitutes the calculation section, and an optical fiber section 10, and which measures the temperature and strain of a measurement target 3. The optical fiber section 10 comprises a sensing fiber 11 and connecting fibers 12 and 13. The sensing fiber 11 and connecting fibers 12 and 13 are serially connected via a connection portion with a structure such as the structure shown in FIG. 2. FIG. 2 shows specific embodiments of the connection portion between the sensing fiber 11 and connecting fibers 12 and 13.

The finder 5 detects the spectra (Brillouin spectra) of the Brillouin scattered light that are output by the optical fiber section 10. That is, the finder 5 supplies pumping light of a predetermined wavelength to the optical fiber section 10 via both ends or one end of the optical fiber section 10 and detects the Brillouin spectrum from the optical fiber section 10 that is obtained in response to the supply of the pumping light. The Brillouin scattered light is known as scattered light that is down-converted in the opposite direction from the direction of travel of the pumping light as a result of the interaction between the pumping light and the acoustic wave generated as a result of the pumping light. The acoustic waves are generated in the optical fiber as a result of the pumping light when the pumping light is propagated within the optical fiber. A Brillouin spectrum is also known as the gain spectrum experienced by the Brillouin scattered light.

Figure 3:
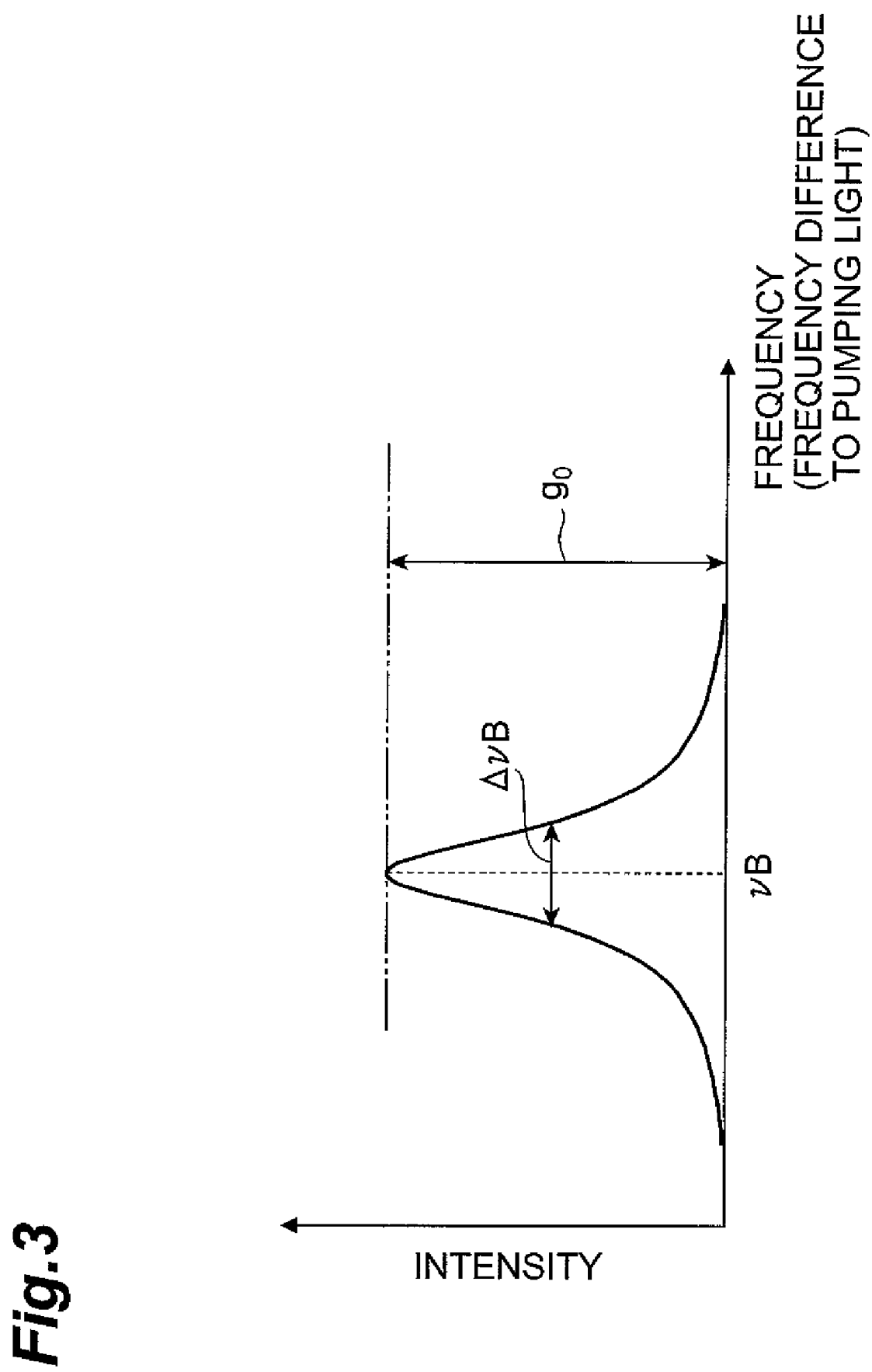
FIG. 3 shows spectra of Brillouin scattered light (Brillouin spectra)

Here, FIG. 3 shows a Brillouin spectrum. As shown in FIG. 3, the Brillouin spectrum is represented by a Lorentz-type function of the kind in Equation (1) below, where the frequency difference between the pumping light and Brillouin scattered light is ν.

$$g_B(\nu) = \frac{g_0}{1 + \{2(\nu - \nu_B)/\Delta\nu_B\}^2} \quad (1)$$

In Equation 1, $g_0$ represents the maximum gain, $\nu_B$ represents the peak frequency (the center frequency of the peak of the Brillouin spectrum), and $\Delta\nu_B$ represents the peak line width (the full width at half maximum of the peak of the Brillouin spectrum). The maximum gain $g_0$, the peak frequency $\nu_B$, and the line width $\Delta\nu_B$ are parameters that characterize the Brillouin spectrum. The maximum gain $g_0$, the peak frequency $\nu_B$, and the peak line width $\Delta\nu_B$ change with dependence on the temperature and strain of the optical fiber.

The optical fiber section 10 includes a sensing fiber 11 and connecting fibers 12 and 13. The sensing fiber 11 and connecting fibers 12 and 13 are connected according to a variety of specific embodiments of the kind shown in FIG. 2. As shown in the area (a) of FIG. 2 and in FIG. 1, the sensing fiber 11 and connecting fibers 12 and 13 may also be optically connected by means of a connector 14 (mechanical connection mechanism). In addition, as shown in the area (b) of FIG. 2, the sensing fiber 11 and connecting fibers 12 and 13 may also be fusion-spliced (14a in FIG. 2 represents the fusion splicing point). In addition, as shown in the area (c) of FIG. 2, the sensing fiber 11 and connecting fibers 12 and 13 may also be mechanically connected by a substrate 14b with a V-shaped groove and a cover plate 14c. The connection mechanism shown in the area (c) of FIG. 2 is implemented as a result of the substrate 14b and the cover plate 14c being bonded in a state where the tip of the sensing fiber 11 and either of the tips of the connecting fibers 12 and 13 are disposed in the V-shaped groove provided in the substrate 14b.

The sensing fiber 11 is disposed in the vicinity of the measurement target 3. More specifically, the sensing fiber 11 is installed in a state of being pasted, immersed, or embedded in the measurement target 3. Therefore, the temperature and strain-applied state of the sensing fiber 11 changes upon receiving the effects of the temperature and strain of the measurement target 3. In addition, the sensing fiber 11 is an optical fiber that has a pure silica core and a length of 100 meters, for example. The sensing fiber 11 has a Brillouin spectrum peak frequency in the predetermined temperature and predetermined strain-applied state on the order of 11.08 GHz and a peak line width (spectral peak full width at half maximum) of 50 MHz. The temperature at this time is room temperature (300 K) and the applied strain is 0% (given by rendering the degree of change in the length of the sensing fiber 11 when the two ends of the sensing fiber 11 are pulled on percentage).

However, the connecting fibers 12 and 13 are serially connected via the connector 14 to each of the two ends of the sensing fiber 11. The respective first ends of the connecting fibers 12 and 13 are optically connected to the sensing fiber 11 while the other ends of the connecting fibers 12 and 13 are connected to the finder 5. The connecting fibers 12 and 13 may also be contained in the finder 5. The connecting fibers 12 and 13 are not connected to the measurement target 3. The connecting fibers 12 and 13 are single-mode fibers that have a Brillouin spectrum peak frequency in the predetermined temperature and predetermined strain-applied state that is on the order of 10.85 GHz and a peak line width that is on the order of 50 MHz, for example. In addition, the total length of the connecting fibers 12 and 13 is on the order of 20 meters.

In other words, the difference between the peak frequency of the Brillouin spectrum of the sensing fiber 11 in a predetermined temperature and predetermined strain-applied state and the peak frequency of the Brillouin spectrum of the connecting fibers 12 and 13 in a predetermined temperature and predetermined strain-applied state is substantially 170 MHz which is equal to or more than the peak line width (50 MHz) of the Brillouin spectrum of the sensing fiber 11 and connecting fibers 12 and 13 respectively in the predetermined temperature and predetermined strain-applied state.

The connecting fibers 12 and 13 are preferably optical fibers with a low Brillouin spectrum sensitivity to the applied strain or temperature. This is because it is possible to accurately discriminate the parameters of the Brillouin spectrum of the sensing fiber 11 that correspond with the measurement area of the measurement target and the parameters of the Brillouin spectrum of the connecting fibers 12 and 13. FIG. 4 is a table that brings together various elements of a variety of samples that are prepared for the connecting optical fibers 12 and 13. That is, FIG. 4 shows elements as the connecting fibers 12 and 13, namely, a sample 1 having a pure silica core and samples 2 and 3 which have a core for which the relative refractive index difference with respect to the pure silica is 0.80% or more. More specifically, the connecting fiber of sample 1 has a frequency shift temperature coefficient of 0.60 MHz/K at 77 K and a frequency shift temperature coefficient of 1.40 MHz/K at 300 K. The connecting fiber of sample 2 has a frequency shift temperature coefficient of 0.17 MHz/K at 77 K and a frequency shift temperature coefficient of 1.20 MHz/K at 300 K. The connecting fiber of sample 3 has a frequency shift temperature coefficient of 0 MHz/K at 77 K and a frequency shift temperature coefficient of 0.74 MHz/K at 300 K.

Here, in addition to the aforementioned pure silica core fiber (having a core with a relative refractive index difference Δ of 0% with respect to pure silica, a Brillouin spectrum with a peak frequency VB of 11.08 GHz at 300 K and a peak line width of 50 MHz), fibers that can be applied as the sensing fiber 11 include a single-mode fiber (described subsequently) (having a core with a relative refractive index difference Δ of 0.35% with respect to pure silica, a Brillouin spectrum with a peak frequency $v_B$ of 10.85 GHz at 300 K, and a peak line width of about 30 to 50 MHz), a bend-insensitive fiber (having a core with a relative refractive index difference Δ of 0.80% with respect to pure silica, a Brillouin spectrum with a peak frequency $v_B$ of 10.57 GHz at 300 K and a peak line width of 30 to 50 MHz). Thus, the peak frequency VB of the Brillouin spectrum of the sensing fiber 11 shifts toward a lower frequency at the rate of approximately 600 MHz for every 1% increase in the core relative refractive index difference Δ. Therefore, under the conditions of a temperature of 300 K and a 0% applied strain, in order to establish the interval between the peak frequency of the Brillouin spectrum of the sensing fiber 11 and the peak frequency of the Brillouin spectrum of the connecting optical fibers 12 and 13 at or above the peak line width (50 MHz), the difference between the relative refractive index difference of the core of the sensing fiber 11 and the relative refractive index of the connecting fibers 12 and 13 must be at least 0.083% (≈50 MHz/600 MHz). That is, in cases where the sensing fiber 11 is a pure silica core fiber, an optical fiber that has a core with a relative refractive index difference relative to pure silica which is equal to or more than 0.083% may also be selected as the connecting fibers 12 and 13.

Figure 5:
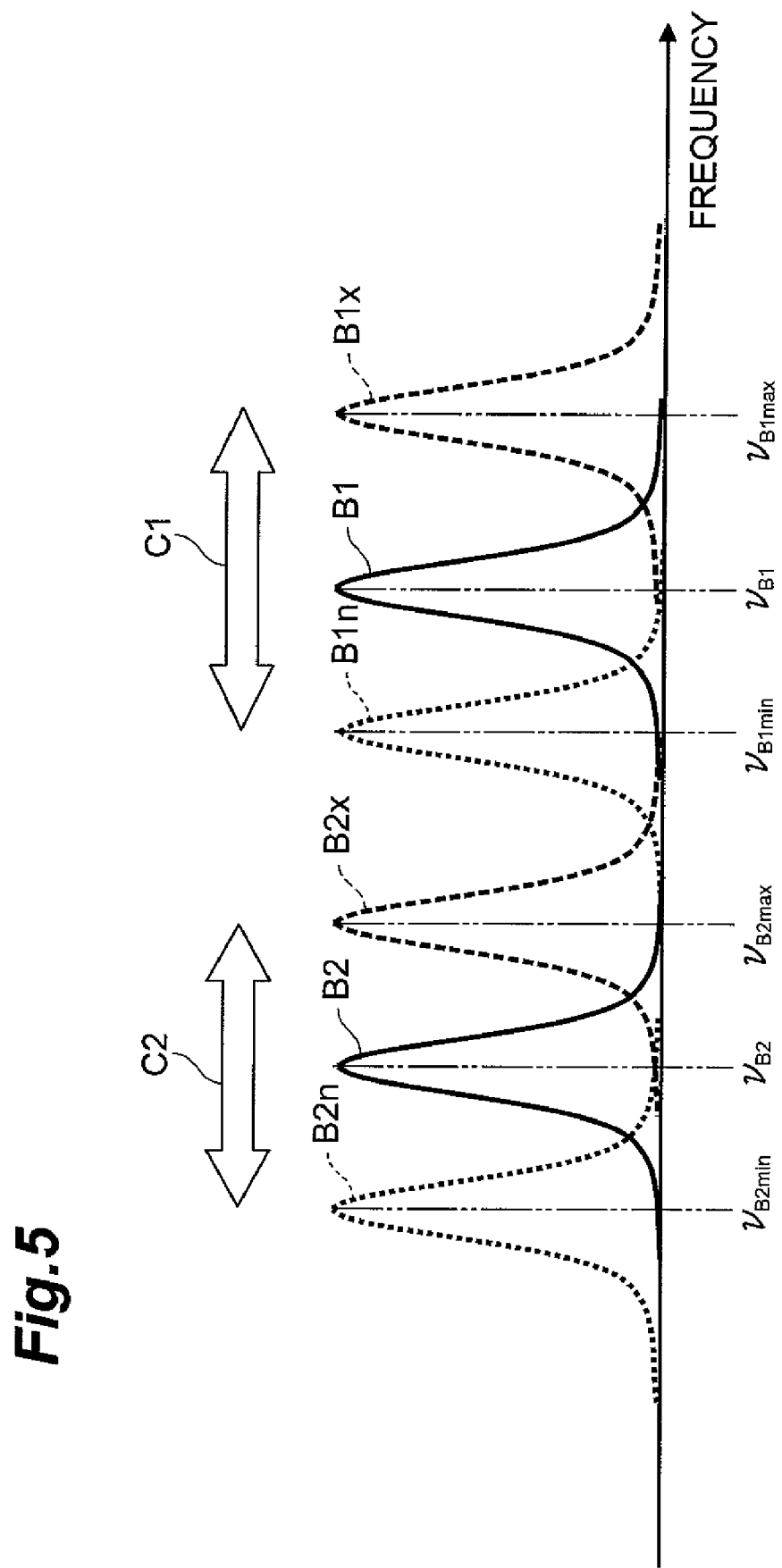
FIG. 5 shows Brillouin spectra of the first and second optical fibers which are applied to the Brillouin spectrum measuring apparatus according to the first embodiment.

The relationship between the parameters of the Brillouin spectra of optical fibers of two types (first and second fibers) will be described in more detail next with reference to FIG. 5. FIG. 5 shows Brillouin spectra of optical fibers of two types. For the finder 5, either one of the first and second fibers functions as the sensing fiber 11 while the other optical fiber functions as the connecting fibers 12 and 13.

A Brillouin spectrum B1 is the Brillouin spectrum of the first fiber in a predetermined temperature and predetermined strain-applied state. The peak frequency $v_{B1}$ is the peak frequency of the Brillouin spectrum B1 in a predetermined temperature and predetermined strain-applied state. The Brillouin spectrum B1n is the Brillouin spectrum of the first fiber for which the peak frequency in the predetermined temperature range and predetermined strain application range has a minimum value $v_{B1min}$. The Brillouin spectrum B1x is the Brillouin spectrum of the first fiber for which the peak frequency in the predetermined temperature range and predetermined strain application range has a maximum value $v_{B1max}$. The frequency range C1 represents the fluctuation range of the peak frequency of the Brillouin spectrum of the first fiber in the predetermined temperature range and predetermined strain application range.

The Brillouin spectrum B2 is the Brillouin spectrum of the second fiber in a predetermined temperature and predetermined strain-applied state. The peak frequency $v_{B2}$ is the peak frequency of the Brillouin spectrum B2 in a predetermined temperature and predetermined strain-applied state. The Brillouin spectrum B2n is the Brillouin spectrum of the second fiber for which the peak frequency in a predetermined temperature range and a predetermined strain application range has a minimum value $v_{B2min}$. The Brillouin spectrum B2x is the Brillouin spectrum of the second fiber for which the peak frequency in a predetermined temperature range and a predetermined strain application range has a maximum value $v_{B2max}$. The frequency range C2 represents the fluctuation range of the peak frequency of the Brillouin spectrum of the second fiber in the predetermined temperature range and predetermined strain application range.

As shown in FIG. 5, the frequency range C1 and frequency range C2 do not overlap one another. That is, according to the first embodiment, in a predetermined temperature range and predetermined strain application range, the minimum value $v_{B1min}$ of the peak frequency of the Brillouin spectrum B1 of the first fiber is larger than the maximum value $v_{B2max}$ of the peak frequency of the Brillouin spectrum B2 of the second fiber.

In addition, in the predetermined temperature range and predetermined strain application range, the difference between the minimum value $v_{B1min}$ of the peak frequency of the Brillouin spectrum B1 of the first fiber and the maximum value $v_{B2max}$ of the peak frequency of the Brillouin spectrum B2 of the second fiber is equal to or more than the peak line width of the Brillouin spectrum B1 of the first fiber and the Brillouin spectrum B2 of the second fiber.

Figure 6:
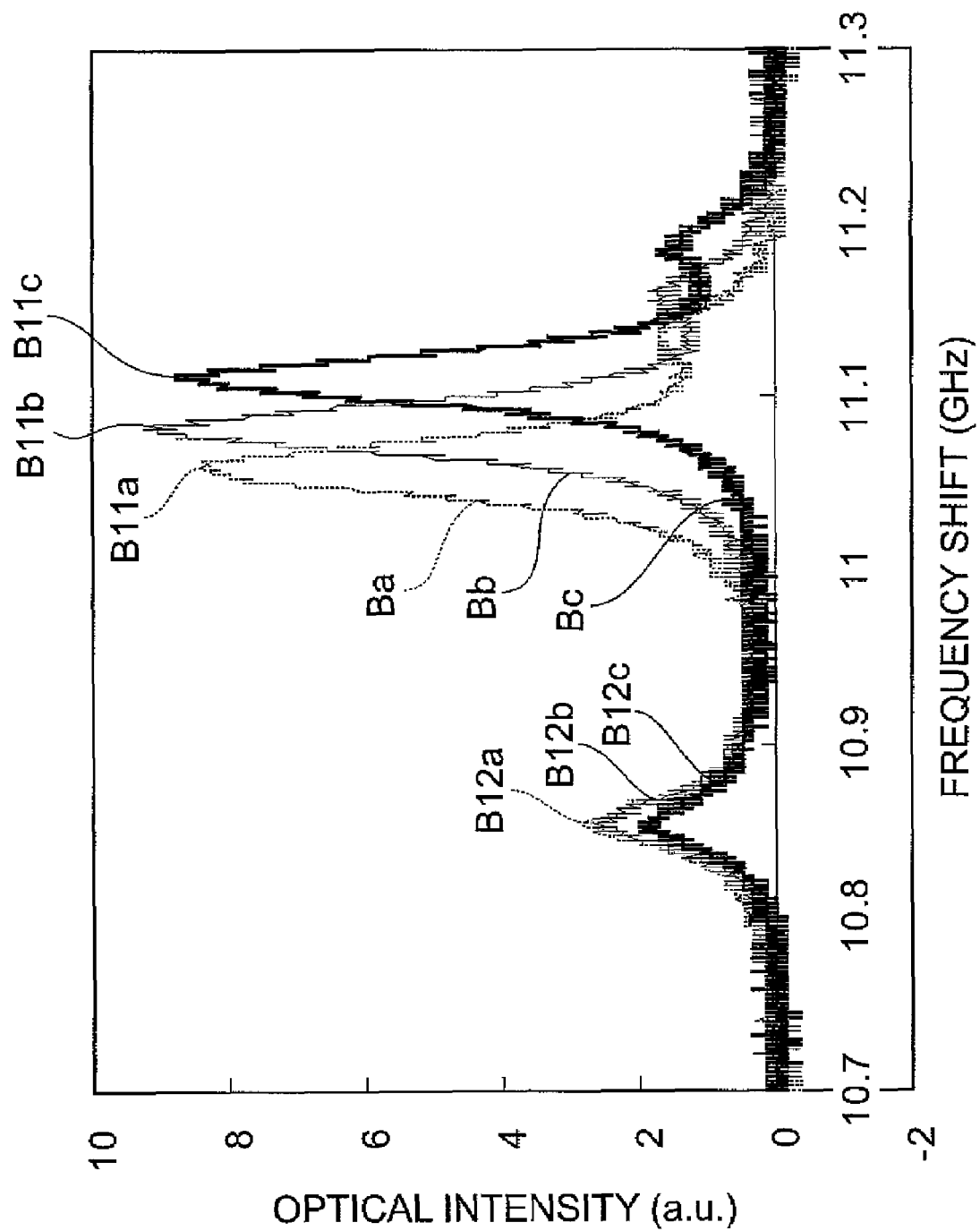
FIG. 6 shows Brillouin spectra for the optical fiber section that is applied to the Brillouin spectrum measuring apparatus according to the first embodiment.

Returning to FIG. 1, the finder 5 detects both the Brillouin spectrum of the sensing fiber 11 and the Brillouin spectrum of the connecting fibers 12 and 13 by detecting the Brillouin spectra which are output by the optical fiber section 10. The finder 5 outputs information representing the Brillouin spectra thus detected to the discrimination section 7. FIG. 6 shows Brillouin spectra for the optical fiber section that is applied to the Brillouin spectrum measuring apparatus 1 according to the first embodiment. FIG. 6 represents Brillouin spectra which are obtained from the optical fiber section 10 in a state where the applied strain to the sensing fiber 11 and connecting fibers 12 and 13 is 0% and the temperature of the connecting fibers 12 and 13 is room temperature.

The Brillouin spectrum Ba is obtained in a case where the temperature of the measurement target 3 and sensing fiber 11 is 277 K. The Brillouin spectrum Ba comprises a Brillouin spectrum B1a of the sensing fiber 11 and a Brillouin spectrum B12a of the connecting fibers 12 and 13. The Brillouin spectrum Bb is obtained in a case where the temperature of the measurement target 3 and sensing fiber 11 is 296 K. The Brillouin spectrum Bb comprises a Brillouin spectrum B11b of the sensing fiber 11 and a Brillouin spectrum B12b of the connecting fibers 12 and 13. The Brillouin spectrum Bc is obtained in a case where the temperature of the measurement target 3 and sensing fiber 11 is 323 K. The Brillouin spectrum Bc comprises a Brillouin spectrum B11c of the sensing fiber 11 and a Brillouin spectrum B12c of the connecting fibers 12 and 13.

As shown in FIG. 6, the difference between the peak frequencies of the Brillouin spectra B11a to B11c of the sensing fiber 1 and the peak frequencies of the Brillouin spectra B12a to B12c of the connecting fibers 12 and 13 is equal to or more than the respective peak widths of the Brillouin spectra B11a to B11c and the Brillouin spectra B12a to B12c. In addition, the peak frequencies of the Brillouin spectra B11a to B11c of the sensing fiber 11 are higher than the peak frequencies of the Brillouin spectra B12a to B12c of the connecting fibers 12 and 13 and shift toward higher frequencies as the temperature of the sensing fiber 11 rises.

Returning now to FIG. 1, the discrimination section 7 discriminates each of the Brillouin spectrum of the sensing fiber 11 and the Brillouin spectrum of the connecting fibers 12 and 13 on the basis of the Brillouin spectra of the optical fiber section 10 detected by the finder 5 (confirms the connection points between the sensing fiber 11 and connecting fibers 12 and 13 based on the measurement data). For example, when information representing the Brillouin spectrum Ba of FIG. 6 is input via the finder 5, the discrimination section 7 discriminates the fact that the Brillouin spectrum B11a corresponds to the sensing fiber 11 and that the Brillouin spectrum B12a corresponds to the connection fibers 12 and 13. The discrimination section 7 outputs information representing the Brillouin spectra discriminated as corresponding with the sensing fiber 11 to the temperature and strain measurement section 9, which is the calculation section.

The temperature and strain measurement section 9 utilizes at least one of the peak frequency, the peak line width, or gain of the Brillouin spectrum represented by the information output from the discrimination section 7 to measure the temperature and strain of the sensing fiber 11. Further, the temperature and strain measurement section 9 analyzes the temperature and strain of the measurement target 3 by using the temperature and strain thus measured.

Figure 7:
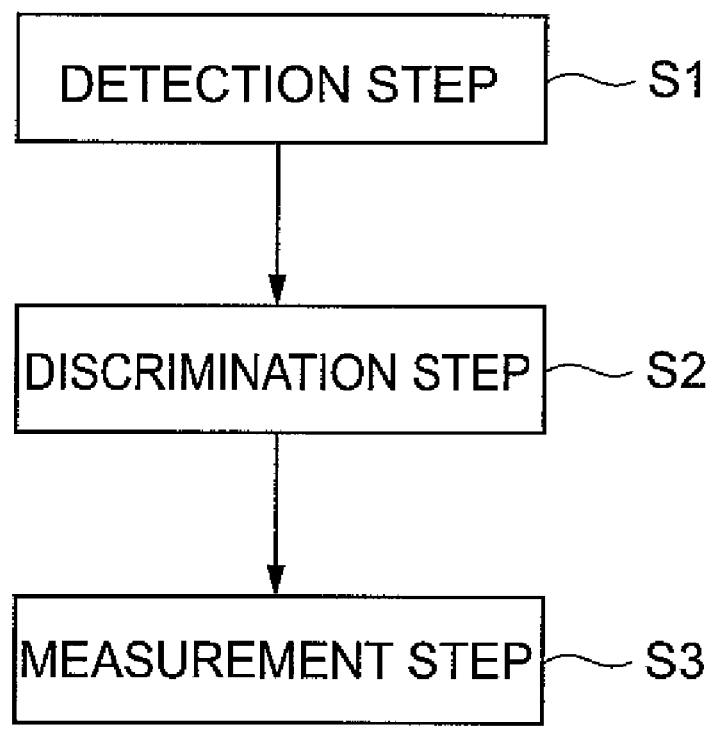
FIG. 7 is a flowchart that serves to illustrate the operation of the Brillouin spectrum measuring apparatus according to the first embodiment (the Brillouin spectrum measuring method according to the present invention)

The Brillouin spectrum measuring apparatus 1 according to the first embodiment measures the Brillouin spectrum of the sensing fiber 11 by means of the Brillouin spectrum measuring method shown in FIG. 7 and analyzes the temperature and strain of the measurement target 3. FIG. 7 is a flowchart for describing the operation of the Brillouin spectrum measuring apparatus according to the first embodiment (the Brillouin spectrum measuring method according to the present invention). First, in detection step S1, the finder 5 detects the Brillouin spectrum output by the optical fiber section 10.

The detection step S1 is carried out in a state where the sensing fiber 11 and connecting fibers 12 and 13 are in a predetermined temperature range and predetermined strain application range. The predetermined temperature range and predetermined strain application range are ranges for which the difference between the minimum value $v_{B1min}$ of the peak frequency of the Brillouin spectrum B1 of the sensing fiber 11 and the maximum value $v_{B2max}$ of the peak frequency of the Brillouin spectrum B2 of the connecting fibers 12 and 13 is in a range equal to or more than the line width (50 MHz) of the Brillouin spectrum B1 of the sensing fiber 11 and the Brillouin spectrum B2 of connecting fibers 12 and 13.

Figure 8:
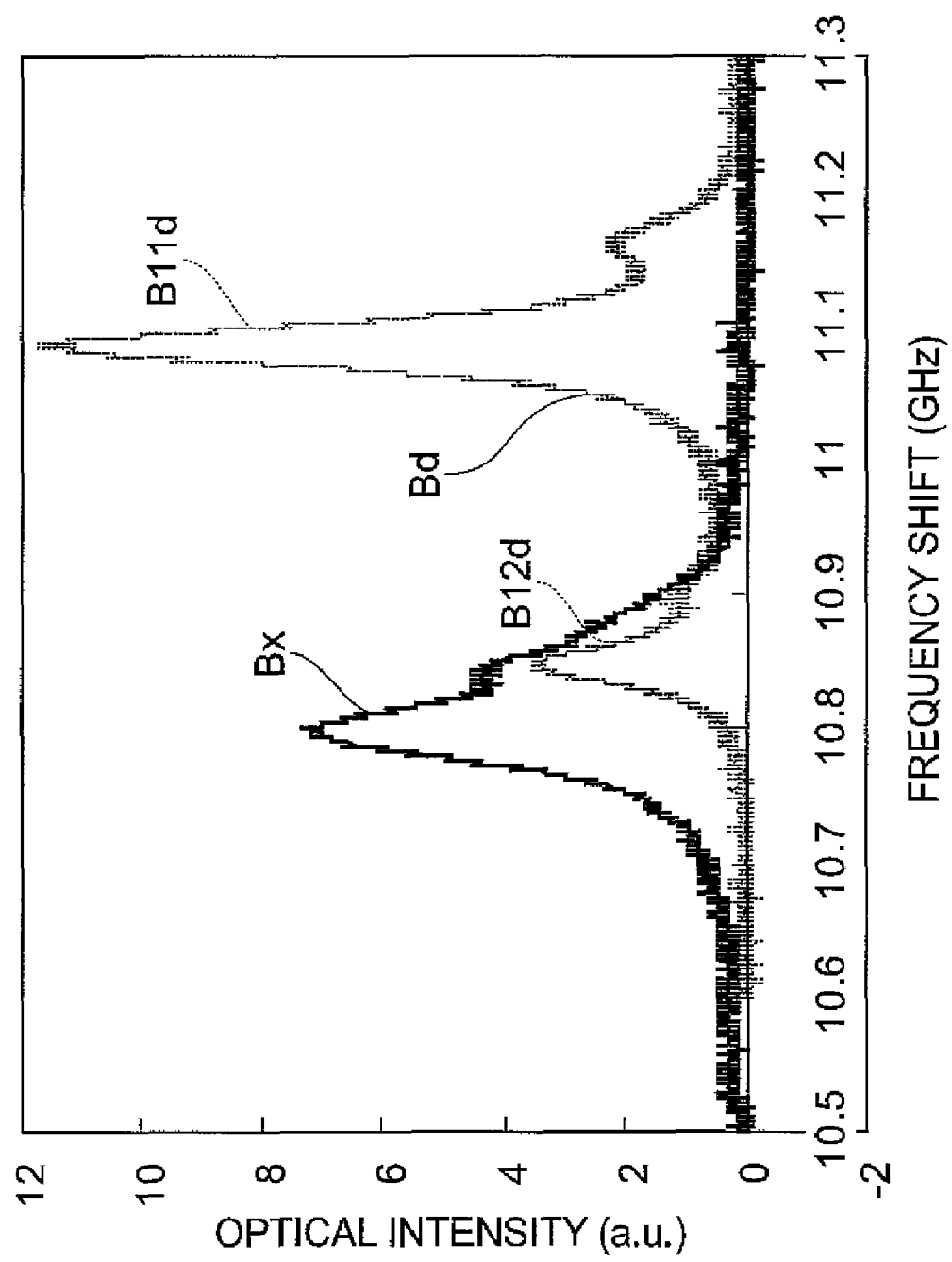
FIG. 8 shows Brillouin spectra for the optical fiber section that is applied to the Brillouin spectrum measuring apparatus according to the first embodiment.

FIG. 8 shows Brillouin spectra of optical fiber section 10 which is applied to the Brillouin spectrum measuring apparatus 1 according to the first embodiment. That is, FIG. 8 represents Brillouin spectra from the optical fiber section 10 detected by the finder 5 in a state where the applied strain of the sensing fiber 11 and connecting fibers 12 and 13 is 0% and the temperature of the connecting fibers 12 and 13 is room temperature.

The Brillouin spectrum Bd is obtained in a case where the temperature of the measurement target 3 and sensing fiber 11 is 300 K. The Brillouin spectrum Bd comprises a Brillouin spectrum B11d of the sensing fiber 11 and a Brillouin spectrum B12d of the connecting fibers 12 and 13. The peak frequency of the Brillouin spectrum B11d of the sensing fiber 11 and the peak frequency of the Brillouin spectrum B12d of the connecting fibers 12 and 13 are spaced apart by a line width or more from the Brillouin spectrum B11d and Brillouin spectrum B12d on the frequency axis.

The Brillouin spectrum Bx is obtained in a case where the temperature of the measurement target 3 and the sensing fiber 11 is 77 K. For the Brillouin spectrum Bx, the difference between the peak frequency of the Brillouin spectrum of the sensing fiber 11 and the peak frequency of the Brillouin spectrum of the connecting fibers 12 and 13 is smaller than the peak line width of the respective Brillouin spectra of the sensing fiber 11 and connecting fibers 12 and 13 on the frequency axis. Accordingly, it is not possible to accurately discriminate the parameters of the Brillouin spectrum of the sensing fiber 11 or the parameters of the Brillouin spectrum of the connecting fibers 12 and 13 from the Brillouin spectrum Bx.

When the temperature of the sensing fiber 11 rises by 1° C., the peak frequency $v_B$ of the Brillouin spectrum of the sensing fiber 11 shifts toward a higher frequency at the rate of 1 to 1.36 MHz. Therefore, if the temperature of the measurement target 3 and sensing fiber 11 is in a range of 150 K or more, the difference between the minimum value $v_{B1min}$ of the peak frequency of the Brillouin spectrum B1 of the sensing fiber 11 and the maximum value $v_{B2max}$ of the peak frequency of the Brillouin spectrum B2 of the connecting fibers 12 and 13 is equal to or more than the peak line widths (50 MHz) of the Brillouin spectrum B1 of the sensing fiber 11 and the Brillouin spectrum B2 of the connecting fibers 12 and 13. Here, the temperature range is equal to or more than 150 K and the applied strain is on the order of 0%.

In order that the minimum value $v_{B1min}$ of the peak frequency of the Brillouin spectrum B1 of the sensing fiber 11 be greater than the maximum value $v_{B2max}$ of the peak frequency of the Brillouin spectrum B2 of the connecting fibers 12 and 13, the following condition must be satisfied for the predetermined temperature range $\Delta_T$ (maximum temperature ($T_{MAX}$)—the minimum temperature ($T_{MIN}$)) and the applied strain 0%:

$$600(MHz) \times \Delta_D(\%) - 1(MHz/K) \times \Delta_T(K) \geq 0(MHz).$$

Here, $\Delta_D$ is the difference between the relative refractive index difference of the cores of the connecting fibers 12 and 13 and the relative refractive index difference of the core of the sensing fiber 11. For example, in cases where the temperature range is 150 K to 300 K, $\Delta_D$ may be equal to or more than 0.25% and the sensing fiber 11 and connecting fibers 12 and 13 may be selected to satisfy this condition.

Additionally, in order that the difference between the peak frequency $v_B$ of the Brillouin spectrum of the sensing fiber 11 and the peak frequency VB of the Brillouin spectrum of the connecting fibers 12 and 13 be greater than the peak line width 50 MHz, the following condition must be satisfied for the predetermined temperature range $\Delta_T$ (maximum temperature ($T_{MAX}$)—the minimum temperature ($T_{MIN}$)) and the applied strain 0%:

$$600(MHz) \times \Delta_D(\%) - 1(MHz/K) \times \Delta_T(K) \geq 50(MHz).$$

For example, in cases where the temperature range is 150 K ($T_{MIN}$) to 300 K ($T_{MAX}$), $\Delta D$ may be equal to or more than 0.33% and the sensing fiber 11 and connecting fibers 12 and 13 may be selected to satisfy this condition.

Returning now to FIG. 7, in the discrimination step S2, the discrimination section 7 discriminates the Brillouin spectrum of the sensing fiber 11 and the Brillouin spectrum of the connecting fibers 12 and 13 on the basis of the Brillouin spectra detected in detection step S1 (confirms the connection points between the sensing fiber 11 and connecting fibers 12 and 13 based on the measurement data). Thereafter, in the measurement step S3, the temperature and strain measurement section 9 measures the temperature and strain of the sensing fiber 11 on the basis of the parameter of the Brillouin spectrum of the sensing fiber 11 discriminated in discrimination step S2. The temperature and strain measurement section 9 then analyzes the temperature and strain of the measurement target 3 on the basis of the temperature and strain thus measured.

As explained hereinabove, in the first embodiment, the difference between the peak frequency of the Brillouin spectrum B1 of the sensing fiber 11 of a predetermined temperature and predetermined strain-applied state and the peak frequency of the Brillouin spectrum B2 of the connecting fibers 12 and 13 of a predetermined temperature and predetermined strain-applied state is equal to or more than the peak line widths of the Brillouin spectra of the sensing fiber 11 and connecting fibers 12 and 13 of a predetermined temperature and predetermined strain-applied state.

Also, according to the first embodiment, the minimum value $v_{B1min}$ of the peak frequency of the Brillouin spectrum B1 of the sensing fiber 11 of the predetermined temperature range or predetermined strain application range is larger than the maximum value $v_{B2max}$ of the peak frequency of the Brillouin spectrum B2 of the connecting fibers 12 and 13 of the predetermined temperature range or predetermined strain application range.

In the first embodiment, in a predetermined temperature range and predetermined strain application range, the difference between the minimum value $v_{B1min}$ of the peak frequency of the Brillouin spectrum B1 of the sensing fiber 11 is larger than the maximum value $v_{B2max}$ of the peak frequency of the Brillouin spectrum B2 of the connecting fibers 12 and 13 is equal to or more than the peak line width of each of the Brillouin spectrum B1 of the sensing fiber 11 and the Brillouin spectrum B2 of the connecting fibers 12 and 13.

Furthermore, the detection step S1 is carried out in a predetermined temperature range and predetermined strain application range in which the difference between the minimum value $v_{B1min}$ of the peak frequency of the Brillouin spectrum B1 of the sensing fiber 11 and the maximum value $v_{B2max}$ of the peak frequency of the Brillouin spectrum B2 of the connecting fibers 12 and 13 is equal to or more than the peak line width of each of the Brillouin spectrum B1 of the sensing fiber 11 and the Brillouin spectrum B2 of the connecting fibers 12 and 13.

That is, with regard to the Brillouin spectra from the optical fiber section 10 which are detected by the finder 5, the difference between the peak frequency of the Brillouin spectrum of the sensing fiber 11 and the peak frequency of the Brillouin spectrum of the connecting fibers 12 and 13 is equal to or more than the peak line width of the respective Brillouin spectra thereof. Hence, the Brillouin spectrum of the sensing fiber 11 and the Brillouin spectrum of the connecting fibers 12 and 13 can be accurately discriminated. As a result, the parameters of the Brillouin spectra that correspond with the sensing fiber 11 and the connecting fibers 12 and 13 can be accurately measured. In other words, the temperature and strain of the measurement target 3 in which the sensing fiber 11 is installed can be accurately analyzed.

The peak frequency of the Brillouin spectrum of the sensing fiber 11 is higher than the peak frequency of the Brillouin spectrum of the connecting fibers 12 and 13 in the state where the temperature is room temperature and the applied strain is 0%. In addition, the peak frequency of the Brillouin spectrum of the sensing fiber shifts toward a higher frequency when the temperature of the sensing fiber 11 rises. Hence, the Brillouin spectrum measuring apparatus 1 according to the first embodiment is particularly preferable for the measurement of temperatures at or above room temperature.

Comparative Example

Figure 9:
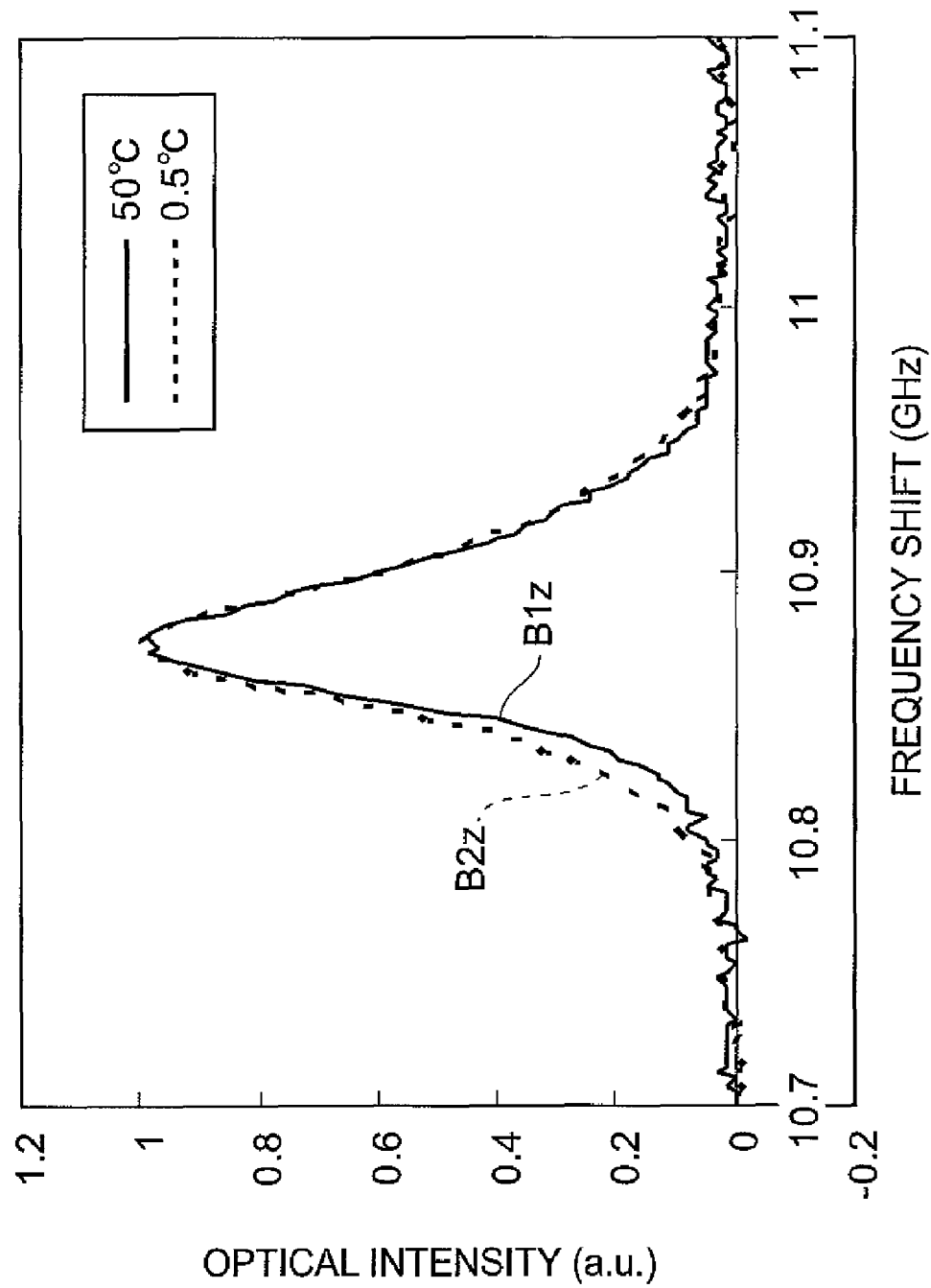
FIG. 9 shows Brillouin spectra for the optical fiber section that is applied to the Brillouin spectrum measuring apparatus according to a comparative example.

For the purpose of a comparison with the first embodiment above, a comparative example in which a single-mode fiber which is five meters' long and has a core for which the relative refractive index difference with respect to pure silica is 0.35% as a result of being doped with germanium is applied as the sensing fiber will be described next. FIG. 9 shows Brillouin spectra for the optical fiber section that is applied to the Brillouin spectrum measuring apparatus according to the comparative example. FIG. 8 shows Brillouin spectra that are output from the optical fiber section in a state where the applied strain with respect to the sensing fiber and the connection fibers 12 and 13 is 0% and the temperature of the connecting fibers 12 and 13 is room temperature.

The Brillouin spectrum B1z is obtained in a case where the temperature of the measurement target 3 and sensing fiber is 323 K (50° C.). For the Brillouin spectrum B1z, the difference between the peak frequency of the Brillouin spectrum of the sensing fiber and the peak frequency of the Brillouin spectrum of the connecting fibers 12 and 13 is smaller than the peak line widths of the Brillouin spectra on the frequency axis. That is, it is not possible to accurately measure the parameters of the Brillouin spectrum of the sensing fiber and the Brillouin spectra of the connecting fibers 12 and 13 from the Brillouin spectrum B1z.

Also, the Brillouin spectrum B2z is obtained in a case where the temperature of the measurement target 3 and sensing fiber is 273.5K. For the Brillouin spectrum B2z, the difference between the peak frequency of the Brillouin spectrum of the sensing fiber and the peak frequency of the Brillouin spectrum of the connecting fibers 12 and 13 is smaller than the peak line widths of the Brillouin spectra on the frequency axis. That is, it is not possible to accurately extract the parameter of the Brillouin spectrum of the sensing fiber and the parameter of the Brillouin spectrum of the connecting fibers 12 and 13 from the Brillouin spectrum B2z.

Namely, in a case where a sensing fiber of the aforementioned type is applied to the Brillouin spectrum measuring apparatus according to the comparative example, the difference between the peak frequency of the Brillouin spectrum of the sensing fiber and the peak frequency of the Brillouin spectrum of the connecting fibers 12 and 13 in a predetermined temperature range of at least 150 K is smaller than the line width of the Brillouin spectra on the frequency axis. That is, the parameter of the Brillouin spectrum of the sensing fiber cannot be measured.

In contrast to the comparative example above, in the first embodiment above, the sensing fiber 11 and connecting fibers 12 and 13 are selected so that the difference between the peak frequency of the Brillouin spectrum of the sensing fiber 11 and peak frequency of the Brillouin spectrum of the connecting fibers 12 and 13 in the measurement target temperature range and strain application range is equal to or more than the peak line widths of the respective Brillouin spectra on the frequency axis. That is, in the first embodiment above, the parameter of the Brillouin spectrum of the sensing fiber and the parameter of the Brillouin spectrum of the connecting fibers 12 and 13 can be accurately measured.

A variety of modifications of the first embodiment are possible. For example, the predetermined temperature range may be in the range including 67 to 77 K or include 300 K or may also be from 200 to 600 K. In addition, the predetermined strain application range may also be in the ranges −1% to +1%, −0.1% to +0.1%, or −0.01% to +0.01% or may be a range including 0%.

First to third modified examples of the first embodiment will be explained next.

First Modified Example

In the first embodiment above, an optical fiber that is 100 meters' long with a pure silica core (relative refractive index difference of the core with respect to pure silica is 0%) was applied as the sensing fiber 11. In the first modified example of the first embodiment, a single mode fiber about 100 meters' long and the core of which has a relative refractive index difference with respect to pure silica of 0.35% is applied as the sensing fiber.

Figure 10:
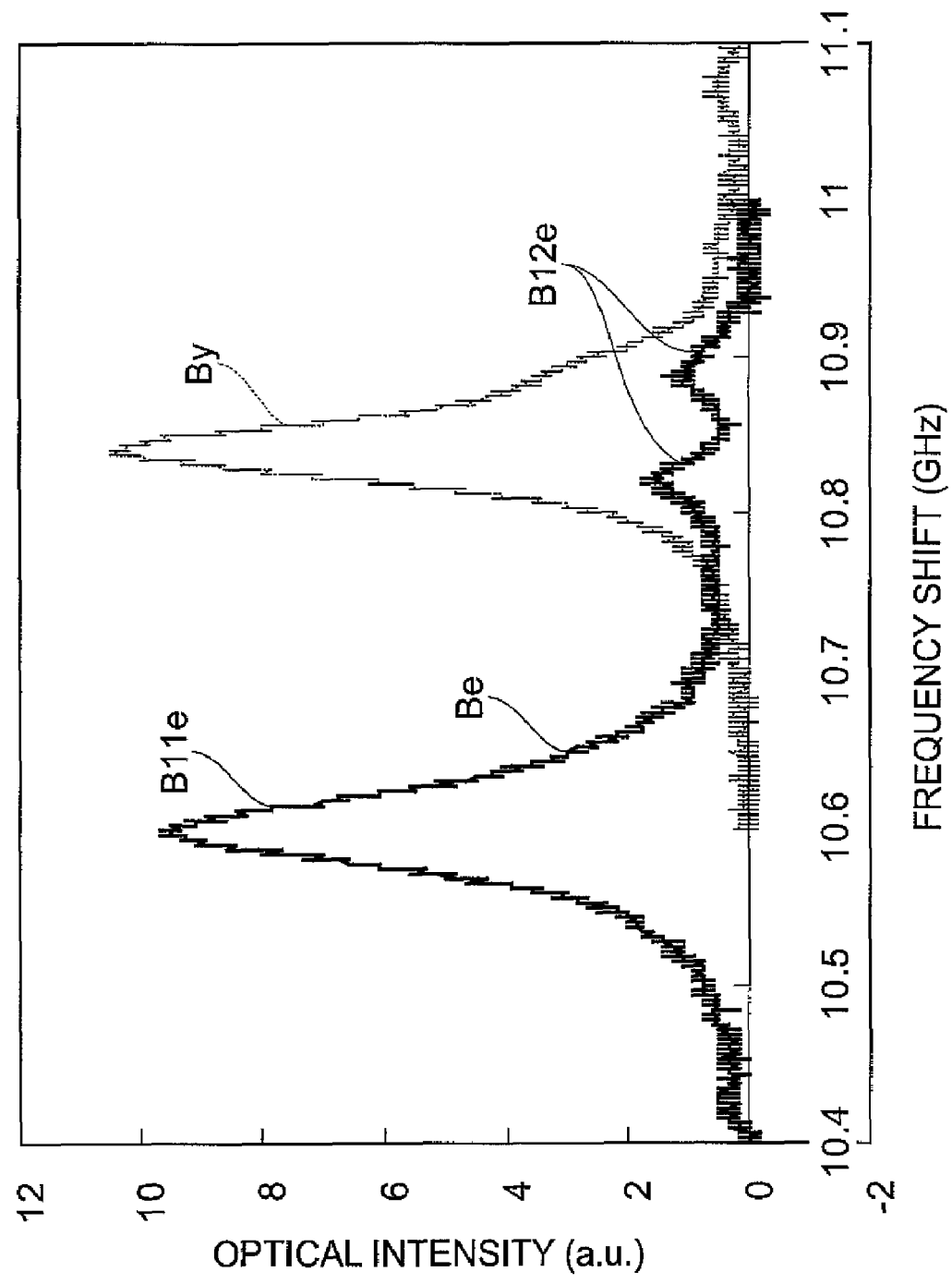
FIG. 10 shows Brillouin spectra for the optical fiber section that is applied to a first modified example of the Brillouin spectrum measuring apparatus according to the first embodiment.

FIG. 10 shows Brillouin spectra for the optical fiber section that is applied to a first modified example of the Brillouin spectrum measuring apparatus according to the first embodiment. That is, FIG. 10 shows Brillouin spectra that are output by the optical fiber section 10 in a state where the applied strain with respect to the sensing fiber 11 and connecting fibers 12 and 13 is 0% and the temperature of the connecting fibers 12 and 13 is room temperature.

The Brillouin spectrum Be is obtained in a case where the temperature of the measurement target 3 and sensing fiber 11 is 77 K. The Brillouin spectrum Be comprises a Brillouin spectrum B11e of the sensing fiber and a Brillouin spectrum B12e of the connecting fibers 12 and 13. The difference between the peak frequency of the Brillouin spectrum B11e of the sensing fiber 11 and the peak frequency of the Brillouin spectrum B12e of the connecting fibers 12 and 13 is equal to or more than the peak line widths of each of the Brillouin spectrum B11e and Brillouin spectrum B12e on the frequency axis.

The Brillouin spectrum By is obtained in a case where the temperature of the measurement target 3 and sensing fiber 11 is 300 K. For the Brillouin spectrum By, the difference between the peak frequency of the Brillouin spectrum of the sensing fiber and the peak frequency of the Brillouin spectrum of the connecting fibers 12 and 13 is smaller than the peak line widths of the respective Brillouin spectra on the frequency axis.

In the case of the sensing fiber 11 applied to the first modified example, if the temperature of the measurement target 3 and sensing fiber 11 is no more than 200 K or at least 400 K and the applied strain-applied to the optical fiber section 10 is 0%, the difference between the minimum value of the peak frequency of the Brillouin spectrum of the sensing fiber 11 and the maximum value of the peak frequency of the Brillouin spectrum of the connecting fibers 12 and 13 is equal to or more than the peak line widths of each of the Brillouin spectrum of the sensing fiber 11 and the Brillouin spectrum of the connecting fibers 12 and 13. In accordance with the first modified example, the predetermined temperature range is no more than 200 K or at least 400 K and the predetermined applied strain is 0%.

In other words, in a state where the temperature is no more than 200 K and the applied strain is 0%, the maximum value of the peak frequency of the Brillouin spectrum B1 of the sensing fiber 11 is smaller than the minimum value of the peak frequency of the Brillouin spectrum B2 of the connecting fibers 12 and 13. Additionally, in a state where the temperature is at least 400 K and the applied strain is 0%, the minimum value of the peak frequency of the Brillouin spectrum B1 of the sensing fiber 11 is larger than the maximum value of the peak frequency of the Brillouin spectrum B2 of the connecting fibers 12 and 13.

Thus, in accordance with the first modified example, regarding the spectra of the Brillouin scattered light detected by the finder 5, the difference between the peak frequency of the Brillouin spectrum of the sensing fiber and the peak frequency of the Brillouin spectrum of the connecting fibers 12 and 13 is equal to or more than the peak line widths of the respective Brillouin spectra on the frequency axis. That is, the parameters of the Brillouin spectra that correspond with the sensing fiber 11 and the connecting fibers 12 and 13 respectively can be accurately measured. As a result, the temperature and strain of the measurement target 3 can be accurately analyzed.

Second Modified Example

Figure 11:
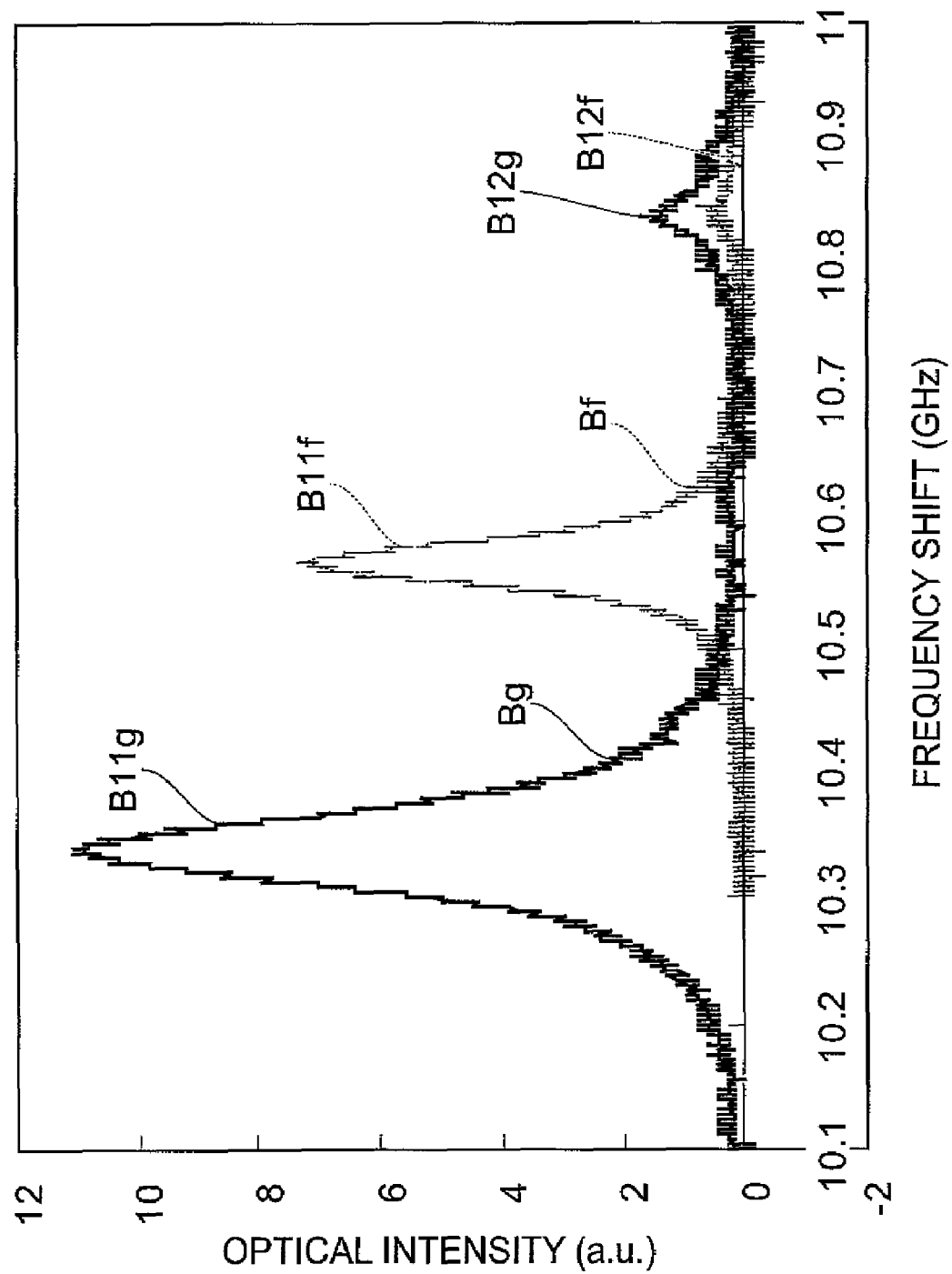
FIG. 11 shows Brillouin spectra for the optical fiber section that is applied to a second modified example of the Brillouin spectrum measuring apparatus according to the first embodiment.

In the second modified example of the first embodiment, a single-mode fiber for which the bending loss is improved (a bend-insensitive fiber) on the order of 100 meters' long and having a core for which the relative refractive index difference with respect to pure silica is set at 0.8% as a result of being doped with germanium is applied as the sensing fiber 11. FIG. 11 shows Brillouin spectra for the optical fiber section that is applied to a second modified example of the Brillouin spectrum measuring apparatus according to the first embodiment. FIG. 11 shows spectra for the Brillouin scattered light that is output by the optical fiber section in a state where the applied strain with respect to the sensing fiber 11 and the connecting fibers 12 and 13 is 0% and the temperature of the connecting fibers 12 and 13 is room temperature.

The Brillouin spectrum Bg is obtained in a case where the temperature of the measurement target 3 and sensing fiber 11 is 77 K. The Brillouin spectrum Bg comprises a Brillouin spectrum B11g of the sensing fiber and a Brillouin spectrum B12g of the connecting fibers 12 and 13. The difference between the peak frequency of the Brillouin spectrum B11g of the sensing fiber 11 and the peak frequency of the Brillouin spectrum B12g of the connecting fibers 12 and 13 is equal to or more than the peak line widths of each of the Brillouin spectrum B11g and Brillouin spectrum B12g on the frequency axis.

The Brillouin spectrum Bf is obtained in a case where the temperature of the measurement target 3 and sensing fiber 11 is 300 K. The Brillouin spectrum Bf comprises a Brillouin spectrum B11f of the sensing fiber and a Brillouin spectrum B12f of the connecting fibers 12 and 13. The peak frequency of the Brillouin spectrum B11f of the sensing fiber 11 and the peak frequency of the Brillouin spectrum B12f of the connecting fibers 12 and 13 are equal to or more than the peak line widths of each of the Brillouin spectrum B11f and Brillouin spectrum B12f on the frequency axis.

In the case of the sensing fiber 11 applied to the second modified example, if the temperature of the measurement target 3 and sensing fiber 11 is no more than 300 K and the applied strain with respect to the whole optical fiber section 10 is 0%, the difference between the minimum value of the peak frequency of the Brillouin spectrum of the sensing fiber 11 and the maximum value of the peak frequency of the Brillouin spectrum of the connecting fibers 12 and 13 is equal to or more than the peak line widths of each of the Brillouin spectrum of the sensing fiber 11 and the Brillouin spectrum of the connecting fibers 12 and 13. Further, according to the second modified example, the predetermined temperature range is no more than 300 K and the predetermined applied strain is 0%.

In a state where the temperature is no more than 300 K and the applied strain is 0%, the maximum value of the peak frequency of the Brillouin spectrum B1 of the sensing fiber 11 is smaller than the minimum value of the peak frequency of the Brillouin spectrum B2 of the connecting fibers 12 and 13.

Thus, in accordance with the second modified example, regarding the Brillouin spectrum from the optical fiber section 10 detected by the finder 5, the difference between the peak frequency of the Brillouin spectrum of the sensing fiber 11 and peak frequency of the Brillouin spectrum of the connecting fibers 12 and 13 is equal to or more than the peak line widths of the respective Brillouin spectra on the frequency axis. That is, the parameters of the Brillouin spectra that correspond with the sensing fiber 11 and the connecting fibers 12 and 13 respectively can be accurately measured. As a result, the temperature or strain of the measurement target 3 can be accurately analyzed.

The peak frequency of the Brillouin spectrum of the sensing fiber 11 is lower than the peak frequency of the Brillouin spectrum of the connecting fibers 12 and 13 in a state where the temperature is 300 K and the applied strain is 0%. In addition, the peak frequency of the Brillouin spectrum of the sensing fiber 11 shifts toward a lower frequency if the temperature of the sensing fiber drops. Hence, the Brillouin spectrum measuring apparatus 1 according to the first embodiment is particularly preferable for the measurement of temperatures at or below 300 K.

Third Modified Example

Figure 12:
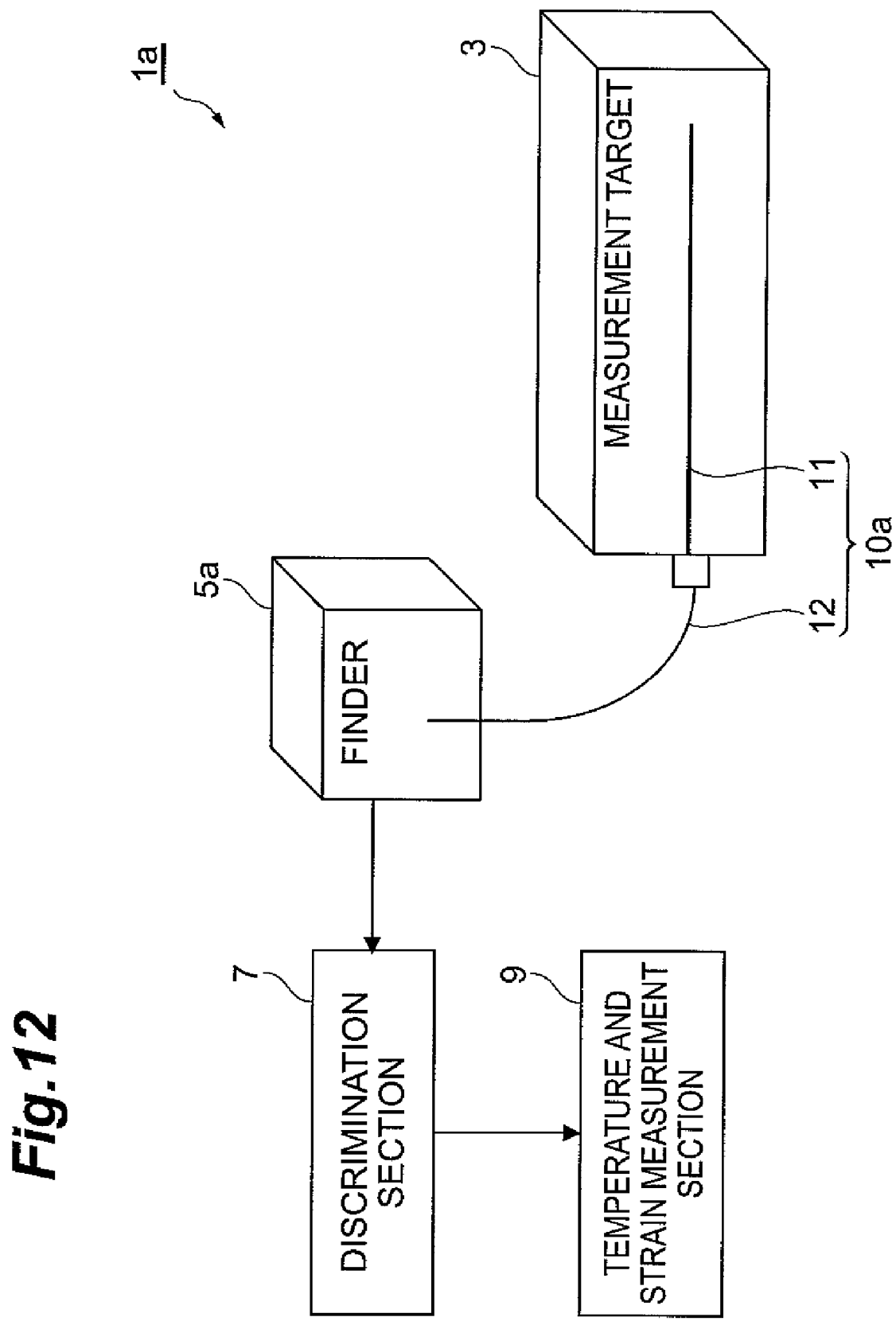
FIG. 12 shows the constitution of a third modified example of the Brillouin spectrum measuring apparatus according to the first embodiment.

FIG. 12 shows the constitution of a third modified example of the Brillouin spectrum measuring apparatus according to the first embodiment. One end of an optical fiber section 10a is connected to a finder 5a which a Brillouin spectrum measuring apparatus 1a according to the third modified example comprises and pulse light (pumping light) is input via this one end to the optical fiber section 10a.

Also, the optical fiber section 10a according to the third modified example is constituted by one sensing fiber 11 and one connecting fiber 12. One end of the connecting fiber 12 is connected to one end of the sensing fiber 11 while the other end of the connecting fiber 12 is connected to the finder 5a. The Brillouin spectrum obtained by the optical fiber section 10a with such a constitution is detected by the finder 5a.

Second Embodiment

Figure 13:
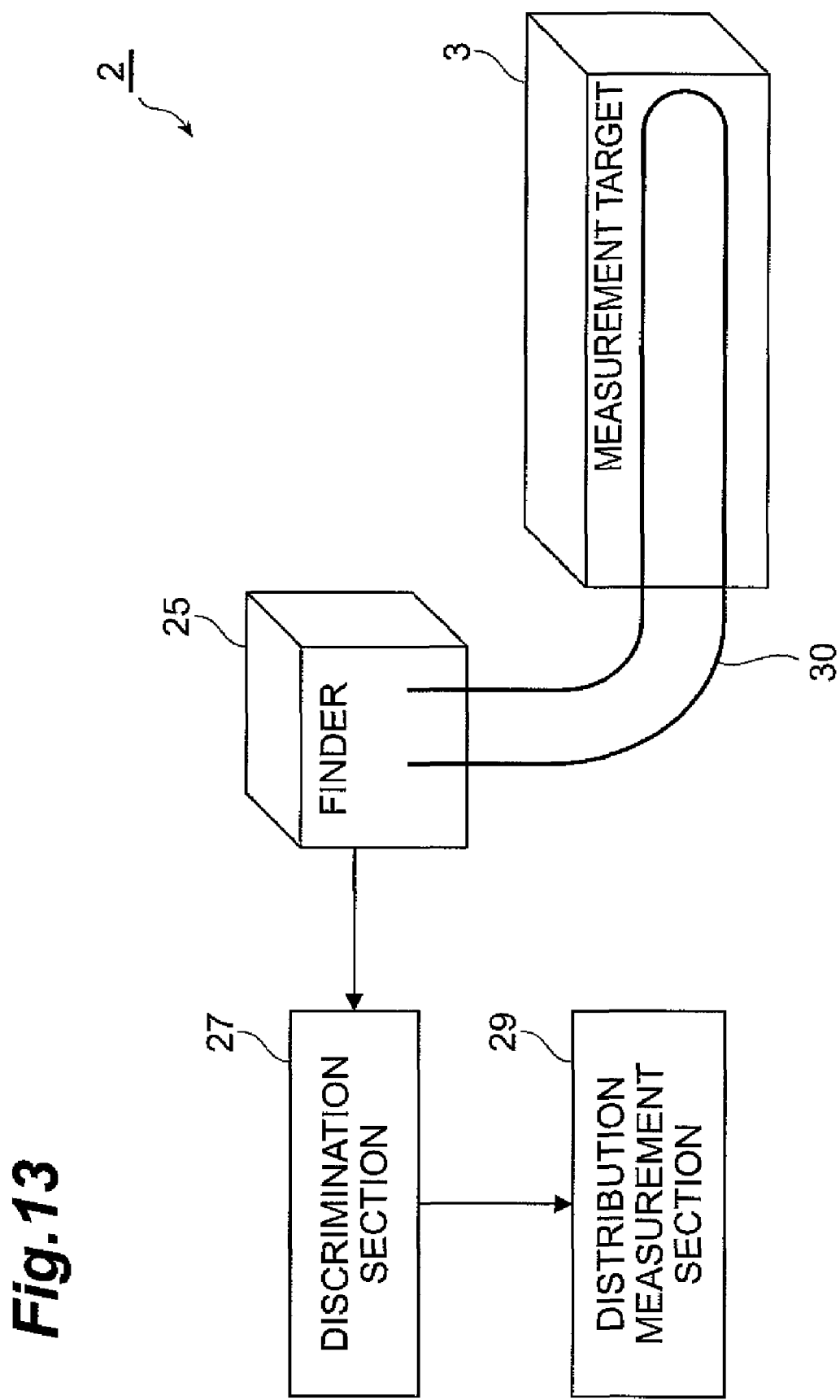
FIG. 13 shows the constitution of a second embodiment of the Brillouin spectrum measuring apparatus according to the present invention.

FIG. 13 shows the constitution of the second embodiment of the Brillouin spectrum measuring apparatus according to the present invention. The Brillouin spectrum measuring apparatus 2 according to the second embodiment comprises a finder 25 (detection means), a discrimination section 27 (discrimination means), a distribution measurement section (measurement means) 29 constituting a calculation section, and an optical fiber section 30 and is an apparatus for measuring distributions of the temperature and strain of the measurement target 3.

Both ends of the optical fiber section 30 are connected to the finder 25. Further, as shown in FIG. 14, the optical fiber section 30 comprises one first optical fiber 41 as the sensing fiber and two second optical fibers 42 as the connecting fibers. FIG. 13 serves to illustrate the constitution of the optical fiber section that is applied to the Brillouin spectrum measuring apparatus according to the second embodiment. In particular, the area (a) of FIG. 14 shows the constitution of the optical fiber section. The connection portion between the first and second optical fibers 41 and 42 possesses a structure of the types shown in FIG. 2.

The first optical fiber 41 is installed in a state of contact with the measurement target 3 from one end to the other. For example, the first optical fiber 41 is installed affixed to, immersed in, or embedded in the measurement target 3.

Two second optical fibers 42 are each serially connected to the two ends of the first optical fiber 41. The respective first ends of these two second optical fibers 42 are connected to both ends of the first optical fiber 41 while the respective other ends are connected to the finder 25. The two second optical fibers 42 are not in contact with the measurement target 3.

The area (b) of FIG. 14 shows the parameter distribution of the Brillouin spectra of the optical fiber section 30 of the predetermined temperature and predetermined strain-applied state. The horizontal axis of the area (b) of FIG. 14 represents the distance from the one end of the optical fiber section 30 and the vertical axis represents the parameter of the Brillouin spectrum. The parameter of the Brillouin spectrum is any of the peak frequency, the peak line width, or the gain of the Brillouin spectrum. The parameter of the Brillouin spectrum varies in accordance with the temperature and strain of the optical fiber.

In the area (b) of FIG. 14, area A41 is a measurement area that corresponds with the first optical fiber 41 and which is subject to the effects of the temperature and strain application of the measurement target 3. Area A42 is a non-measurement area that corresponds to the second optical fiber 42. As shown in the area (b) of FIG. 14, the first optical fiber 41 and second optical fibers 42 differ with respect to at least one Brillouin spectrum parameter value.

In the predetermined temperature and predetermined strain-applied state, the difference between the peak frequency of the Brillouin spectrum of the first optical fiber 41 and the peak frequency of the Brillouin spectrum of the second optical fibers 42 is equal to or more than the peak line widths of each of the Brillouin spectra of the first optical fiber 41 and the second optical fibers 42. In addition, in a predetermined temperature range and predetermined strain application range, the minimum value of the peak frequency of the Brillouin spectrum of the first optical fiber 41 is larger than the maximum value of the peak frequency of the Brillouin spectrum of the second optical fibers.

Additionally, in a predetermined temperature range and a predetermined strain application range, the difference between the minimum value of the peak frequency of the Brillouin spectrum of the first optical fiber 41 and the maximum value of the peak frequency of the Brillouin spectrum of the second optical fibers 42 is equal to or more than the peak line widths of the Brillouin spectra of each of the first optical fiber 41 and second optical fibers 42.

In the second embodiment, the predetermined temperature range may be 67 to 77 K, 273 to 323 K, or a range including 300 K or 0 to 200 K or 200 to 600 K. In addition, according to the second embodiment, the predetermined strain application range may be a range −1% to +1%, −0.1% to +0.1%, or −0.01% to +0.01% or a range including 0%.

The first optical fiber 41 and second optical fibers 42 are selected so that, in the aforementioned predetermined temperature range and predetermined strain application range, the difference between the minimum value of the peak frequency of the Brillouin spectrum of the first optical fiber 41 and the maximum value of the peak frequency of the Brillouin spectrum of the second optical fibers 42 is equal to or more than the peak line widths of the Brillouin spectra of each of the first optical fiber 41 and second optical fibers 42 in the predetermined temperature and predetermined strain-applied state.

In the second embodiment, a general-purpose SMF (single-mode fiber) is applied as the second optical fibers 42, for example. In a state where the temperature is room temperature and there is no strain, the general-purpose SMF has a Brillouin spectrum peak frequency on the order of 10.8 to 10.9 GHz and a peak line width on the order of 50 MHz. In this case, an optical fiber with a pure silica core, for example, is suitable as the first optical fiber 41. An optical fiber with a pure silica core has a Brillouin spectrum peak frequency on the order of 11.08 GHz and a peak line width on the order of 50 MHz in a state where the temperature is room temperature and there is no strain.

Returning now to FIG. 13, the finder 25 detects the Brillouin spectra output by the optical fiber section 30. The finder 25 is a BOCDA (Brillouin Optical Correlation Domain Analysis), for example. The BOCDA has pumping light and probe light that has been frequency-modulated using mutually equal modulation frequencies introduced thereto such that the frequency-modulated pumping light and probe light is propagated in opposite directions from the two ends of the optical fiber section 30 and measures the Brillouin spectrum in the position where the correlation increases as a result of the coincidence between the respective phases of the frequency-modulated pumping light and probe light.

Furthermore, the BOCDA changes the measurement position in the longitudinal direction of the optical fiber section 30 by changing the modulation frequencies of the pumping light and probe light and measures the distribution of the Brillouin spectra in the longitudinal direction of the optical fiber section 30. The finder 25 outputs information indicating the Brillouin spectrum thus detected and information relating to the modulation frequencies of the pumping light and probe light to the discrimination section 27.

The discrimination section 27 discriminates the Brillouin spectrum of the first optical fiber 41 and the Brillouin spectrum of the second optical fibers 42 on the basis of the Brillouin spectra detected by the finder 25 (confirms the connection points between the first optical fiber 41 and second optical fibers 42 based on the measurement data). The discrimination section 27 outputs information representing the Brillouin spectrum of the first optical fiber 41 and information relating to the corresponding modulation frequencies of the pumping light and probe light to the distribution measurement section 29.

The distribution measurement section 29 measures the temperature distribution or strain distribution in the longitudinal direction of the first optical fiber 41 on the basis of the Brillouin spectrum of the first optical fiber 41 discriminated by the discrimination section 27 and the corresponding modulation frequencies of the pumping light and probe light. Further, the distribution measurement section 29 analyzes the temperature distribution or strain distribution of the measurement target 3 on the basis of the measurement result.

Further, the BOCDA measures a Brillouin spectrum in the position where the correlation increases as a result of coincidence between the phases of the pumping light and probe light. However, with a BOCDA, it has proven difficult to directly specify the position in which a Brillouin spectrum is generated.

In the case of the Brillouin spectrum measuring apparatus according to the second embodiment, for Brillouin scattered light detected by the finder 25, the difference between the peak frequency of the Brillouin spectrum of the first optical fiber 41 and the peak frequency of the Brillouin spectrum of the second optical fibers 42 is equal to or more than the peak line widths of the respective Brillouin spectra on the frequency axis. Accordingly, the parameters of the Brillouin spectrum of the first optical fiber 41 and the second optical fibers 42 can be more accurately measured. The measurement position can be clarified by comparing the result of measurement of the distribution in the longitudinal direction of the parameter of the Brillouin spectrum measured by the finder 25 and the actual position in which the second optical fibers 42 are installed. That is, the segment corresponding to the first optical fiber 41 can be directly specified and the Brillouin spectrum corresponding to the measurement target 3 can be clearly identified. As a result, the Brillouin spectrum measuring apparatus according to the second embodiment is able to accurately measure the Brillouin spectrum corresponding to the measurement target.

The present invention is not restricted to the second embodiment as mentioned above. A variety of modifications of the present invention are possible. For example, in the predetermined temperature range and predetermined strain application range, the maximum value of the peak frequency of the Brillouin spectrum of the first optical fiber 41 is smaller than the minimum value of the peak frequency of the Brillouin spectrum of the second optical fibers 42 and the difference between the maximum value of the peak frequency of the Brillouin spectrum of the first optical fiber 41 and the minimum value of the peak frequency of the Brillouin spectrum of the second optical fibers 42 may also be equal to or more than the peak line width of each of the Brillouin spectra of the first optical fiber 41 and second optical fibers 42 in a predetermined temperature and predetermined strain-applied state.

In the second embodiment, the finder 25 uses the BOCDA to measure the distribution of the Brillouin spectrum in the longitudinal direction of the optical fiber section 30. However, the finder 25 may also measure the distribution of the Brillouin spectrum by using a BOTDR or BOTDA or the like. The Brillouin spectrum in a case where a BPTDR is employed is a spectrum of Brillouin backscattered light that is produced by means of pumping light. In the case of a BOTDA or BOCDA, pumping light and probe light are introduced such that same are propagated in opposite directions and the probe light that has been amplified using Brillouin gain that is generated by the pumping light is observed. The Brillouin spectrum in a case where a BOTDA or BOCDA is used is a spectrum of the Brillouin gain that the probe light receives from the pumping light.

For example, the optical fiber section 30 may also comprise a structure of the kind shown in the first to fifth modified examples hereinbelow. In addition, the method of measuring the Brillouin spectrum that is employed by the finder 25 may also be executed as per a sixth modified example.

First Modified Example

An optical fiber section 30a that is applied to the first modified example of the Brillouin spectrum measuring apparatus according to the second embodiment comprises first optical fiber 41 and second optical fibers 42, as shown in FIG. 15. FIG. 15 serves to illustrate the structure of the optical fiber section that is applied to a first modified example of the Brillouin spectrum measuring apparatus according to the second embodiment. In particular, the area (a) of FIG. 15 shows the constitution of the optical fiber section 30a.

The first optical fiber 41 is installed in contact with the measurement target 3. The second optical fibers 42 are inserted into both ends of the part of the first optical fiber 41 that is in contact with the measurement target 3 and are directly connected to the first optical fiber 41. In addition, the second optical fibers 42 are installed in a state of non-contact with the measurement target 3. In the first modified example, the length of the second optical fibers 42 is shorter than the length of the part of the first optical fiber 41 which is in contact with the measurement target 3. Further, the two ends of the optical fiber section 30a are constituted by the first optical fiber 41 and the two ends of the first optical fiber 41 are connected to the finder 25.

The area (b) in FIG. 15 shows the distribution of the Brillouin spectrum parameter of the optical fiber section 30a. The horizontal axis of the area (b) of FIG. 15 represents the distance from the first end of the optical fiber section 30a and the vertical axis represents the Brillouin spectrum parameter. In the area (b) of FIG. 15, area A41 is an area that corresponds to the first optical fiber 41. The area sandwiched by the areas A42 in particular is a measurement area which is subject to the effects of the temperature and strain application of the measurement target 3. Areas A42 are areas that correspond with the second optical fibers 42.

As shown in the area (b) of FIG. 15, the first optical fiber 41 and second optical fibers 42 differ from one another with respect to at least one Brillouin spectrum parameter value. In addition, for the Brillouin scattered light detected by the finder 25, the difference between the peak frequency of the Brillouin spectrum of the first optical fiber 41 and the peak frequency of the Brillouin spectrum of the second optical fibers 42 is equal to or more than the peak line widths of the respective Brillouin spectra on the frequency axis. That is, the Brillouin spectrum that corresponds to the start position of the measurement area (measurement target segment) and the Brillouin spectrum that corresponds to the end position thereof can be discriminated. In other words, the segment (measurement area) that corresponds to the first optical fiber 41 can be directly specified and the parameter of the Brillouin spectrum corresponding with the measurement target 3 can be accurately measured. In addition, the respective parameters of the Brillouin spectra of the first optical fiber 41 and second optical fibers 42 can be accurately measured.

Second Modified Example

The optical fiber section 30b applied to the second modified example of the Brillouin spectrum measuring apparatus according to the second embodiment comprises first optical fibers 41 and second optical fibers 42 as shown in FIG. 16. FIG. 16 serves to illustrate the structure of the optical fiber section that is applied to the second modified example of the Brillouin spectrum measuring apparatus according to the second embodiment. In particular, the area (a) of FIG. 16 shows the constitution of the optical fiber section 30b.

The optical fiber section 30b has a structure in which first optical fibers 41 and second optical fibers 42 of known lengths are alternately serially connected. That is, the second optical fibers 42, which are of a predetermined length, are serially connected to the first optical fibers 41 in a state where the second optical fibers 42 are inserted in predetermined positions in the first optical fibers 41 within the optical fiber section 30b. In the second modified example, the lengths of the plurality of first optical fibers 41 are the same as one another. The lengths of the plurality of second optical fibers 42 are the same as one another, the respective lengths of the second optical fibers 42 are made shorter than the lengths of the first optical fibers 41.

Additionally, the optical fiber section 30b is installed in contact with the measurement target 3. That is, the plurality of first optical fibers 41 and plurality of second optical fibers 42 contained in the optical fiber section 30b are installed in contact with the measurement target 3.

The area (b) of FIG. 16 shows the distribution of the Brillouin spectrum parameter of the optical fiber section 30b. The horizontal axis of the area (b) of FIG. 16 represents the distance from one end of the optical fiber section 30b and the vertical axis represents the parameter of the Brillouin spectrum. In the area (b) of FIG. 16, area A41 is an area that corresponds with the first optical fiber 41 and area A42 is an area that corresponds with the second optical fibers 42.

As shown in the area (b) of FIG. 16, the first optical fibers 41 and second optical fibers 42 differ with respect to at least one Brillouin spectrum parameter value. In addition, where the spectrum of the Brillouin scattered light from the optical fiber section 30b that is detected by the finder 25 is concerned, the difference between the peak frequency of the Brillouin spectrum of the first optical fibers 41 and the peak frequency of the Brillouin spectrum of the second optical fibers 42 is equal to or more than the peak line widths of the respective Brillouin spectra on the frequency axis. That is, the parameters of the Brillouin spectra of the first optical fibers 41 and second optical fibers 42 can be accurately measured and the distribution of the Brillouin spectra in the longitudinal direction of the optical fiber section 30b can be accurately detected.

In the optical fiber section 30b, second optical fibers 42 of different Brillouin spectra are inserted up to a predetermined length into the first optical fibers 41 at predetermined intervals or in predetermined positions. That is, the inserted part of the second optical fibers 42 can function as a position marker. In other words, the measurement position can be clarified by comparing the result of measurement of the distribution in the longitudinal direction of the parameter of the Brillouin spectrum measured by the finder 25 and the actual position in which the second optical fibers 42 are installed. The Brillouin spectrum of the first optical fibers 41 and Brillouin spectrum of the second optical fibers 42 change in accordance with the variation in the physical amount of the measurement target (temperature variation/applied strain) and, therefore, the temperature and strain distributions can be measured without disconnecting the inserted parts of the second optical fibers 42.

Third Modified Example

An optical fiber section 30c that is applied to the third modified example of the Brillouin spectrum measuring apparatus according to the second embodiment comprises first optical fibers 41 and second optical fibers 42 as shown in FIG. 17. FIG. 17 serves to illustrate the structure of the optical fiber section that is applied to the third modified example of the Brillouin spectrum measuring apparatus according to the second embodiment. In particular, the area (a) of FIG. 17 shows the constitution of the optical fiber section 30c.

The optical fiber section 30c has a structure in which first optical fibers 41 and second optical fibers 42 of known lengths are alternately serially connected. That is, the second optical fibers 42, which are of a predetermined length, are serially connected to the first optical fibers 41 in a state where the second optical fibers 42 are inserted in predetermined positions in the first optical fibers 41 within the optical fiber section 30c. In the third modified example, the lengths of the plurality of first optical fibers 41 and the plurality of second optical fibers 42 are the same as one another. In addition, the optical fiber section 30c is installed in contact with the measurement target 3. That is, the plurality of first optical fibers 41 and plurality of second optical fibers 42 contained in the optical fiber section 30c are installed in contact with the measurement target 3.

The area (b) of FIG. 17 shows the distribution of the Brillouin spectrum parameter of the optical fiber section 30c. The horizontal axis of the area (b) of FIG. 17 represents the distance from one end of the optical fiber section 30c and the vertical axis represents the parameter of the Brillouin spectrum. In the area (b) of FIG. 17, area A41 is an area that corresponds with the first optical fibers 41 and area A42 is an area that corresponds with the second optical fibers 42.

As shown in the area (b) of FIG. 17, the first optical fibers 41 and second optical fibers 42 differ with respect to at least one Brillouin spectrum parameter value. In addition, where the Brillouin spectrum from the optical fiber section 30c that is detected by the finder 25 is concerned, the difference between the peak frequency of the Brillouin spectrum of the first optical fibers 41 and the peak frequency of the Brillouin spectrum of the second optical fibers 42 is equal to or more than the peak line widths of the respective Brillouin spectra on the frequency axis. That is, the parameters of the Brillouin spectra of the first optical fibers 41 and second optical fibers 42 can be accurately measured and the distribution of the Brillouin spectra in the longitudinal direction of the optical fiber section 30c can be accurately detected.

The second optical fibers 42 of different Brillouin spectra are inserted up to a predetermined length into the first optical fibers 41 at predetermined intervals or in predetermined positions. That is, the inserted part of the second optical fibers 42 can function as a position marker. In other words, the measurement position can be clarified by comparing the result of measurement of the distribution in the longitudinal direction of the parameter of the Brillouin spectrum measured by the finder 25 and the actual position in which the second optical fibers 42 are installed. The Brillouin spectrum of the first optical fibers 41 and Brillouin spectrum of the second optical fibers 42 change in accordance with the variation in the physical amount of the measurement target (temperature variation/applied strain) and, therefore, the temperature and strain distributions can be measured without disconnecting the inserted parts of the second optical fibers 42.

Fourth Modified Example

An optical fiber section 30d that is applied to the fourth modified example of the Brillouin spectrum measuring apparatus according to the second embodiment comprises first to fifth optical fibers 41 to 45, as shown in FIG. 18. FIG. 18 serves to illustrate the structure of the optical fiber section that is applied to the fourth modified example of the Brillouin spectrum measuring apparatus according to the second embodiment. In particular, the area (a) of FIG. 18 shows the constitution of the optical fiber section 30d.

The optical fiber section 30d has a structure in which the second to fifth optical fibers 42 to 45 of a predetermined length are serially connected in an inserted state in predetermined positions in the first optical fibers 41. That is, the second to fifth optical fibers 42 to 45 are sequentially inserted in the first optical fibers 41 at fixed predetermined intervals and fixed predetermined lengths.

The optical fiber section 30d is installed in contact with the measurement target 3. The plurality of first to fifth optical fibers 41 to 45 contained in the optical fiber section 30d are installed in contact with the measurement target 3. In addition, the difference between the peak frequencies of the respective Brillouin spectra of the first to fifth optical fibers 41 to 45 in a predetermined temperature range and predetermined strain application range is equal to or more than the peak line widths of the respective Brillouin spectra.

The area (b) of FIG. 18 shows the parameter distribution of the Brillouin spectra of the optical fiber section 30d. The horizontal axis of the area (b) of FIG. 18 represents the distance from the one end of the optical fiber section 30d and the vertical axis represents the parameter of the Brillouin spectrum. In the area (b) of FIG. 18, areas A41 to A45 are areas that correspond with the first to fifth optical fibers 41 to 45 respectively.

As shown in the area (b) of FIG. 18, the first to fifth optical fibers 41 to 45 differ from one another with respect to at least one Brillouin spectrum parameter value. In addition, the difference between the peak frequencies of the respective Brillouin spectra of the first to fifth optical fibers 41 to 45 in a predetermined temperature range and predetermined strain application range is equal to or more than the peak line widths of the respective Brillouin spectra. That is, the parameters of the Brillouin spectra of the first optical fibers 41 and second optical fibers 42 can be accurately measured and the distribution of the Brillouin spectra in the longitudinal direction of the optical fiber section 30d can be accurately detected.

In the fourth modified example, second to fifth optical fibers 42 to 45 of different Brillouin spectra are inserted up to a predetermined length into the first optical fibers 41 at predetermined intervals or in predetermined positions. Accordingly, the inserted parts of the second to fifth optical fibers 42 to 45 can function as position markers. In other words, the second to fifth optical fibers 42 to 45 constituting the position markers have mutually different Brillouin spectrum values and, therefore, function as clearer position markers.

Namely, the measurement position can be clarified by comparing the result of measurement of the distribution in the longitudinal direction of the parameter of the Brillouin spectrum measured by the finder 25 and the actual position in which the second optical fibers 42 are installed. The Brillouin spectrum of the first optical fibers 41 and Brillouin spectrum of the second optical fibers 42 change in accordance with the variation in the physical amount of the measurement target (temperature variation/applied strain) and, therefore, the temperature and strain distributions can be measured without disconnecting the inserted parts of the second optical fibers 42.

Fifth Modified Example

The optical fiber section 30e that is applied to the fifth modified example of the Brillouin spectrum measuring apparatus according to the second embodiment comprises first to fifth optical fibers 41 to 45 as shown in FIG. 19. FIG. 19 serves to illustrate the structure of the optical fiber section that is applied to the fifth modified example of the Brillouin spectrum measuring apparatus according to the second embodiment. In particular, the area (a) of FIG. 19 shows the constitution of the optical fiber section 30e.

The optical fiber section 30e has a structure in which the first to fifth optical fibers 41 to 45 which are of the same length are serially connected in order. Further, the optical fiber section 30e is installed in contact with the measurement target 3. In other words, the plurality of first to fifth optical fibers 41 to 45 contained in the optical fiber section 30e are installed in contact with the measurement target 3. The difference between the peak frequencies of the respective Brillouin spectra of the first to fifth optical fibers 41 to 45 in a predetermined temperature range and predetermined strain application range is equal to or more than the peak line widths of the respective Brillouin spectra.

The area (b) of FIG. 19 shows the parameter distribution of the Brillouin spectra of the optical fiber section 30e. The horizontal axis of the area (b) of FIG. 19 represents the distance from the one end of the optical fiber section 30e and the vertical axis represents the parameter of the Brillouin spectrum. In the area (b) of FIG. 19, areas A41 to A45 are areas that correspond with the first to fifth optical fibers 41 to 45 respectively.

As shown in the area (b) of FIG. 19, the first to fifth optical fibers 41 to 45 differ with respect to at least one Brillouin spectrum parameter value. In addition, the difference in the peak frequencies of the respective Brillouin spectra of the first to fifth optical fibers 41 to 45 in a predetermined temperature range and predetermined strain application range is equal to or more than the peak line widths of the respective Brillouin spectra. Accordingly, the parameters of the Brillouin spectra of the first optical fibers 41 and second optical fibers 42 can be accurately measured. Moreover, the distribution of the Brillouin spectra in the longitudinal direction of the optical fiber section 30e can be accurately detected.

In the fifth modified example, second to fifth optical fibers 42 to 45 of different Brillouin spectra are inserted up to a predetermined length into the first optical fibers 41 at predetermined intervals or in predetermined positions. That is, the inserted parts of the second to fifth optical fibers 42 to 45 can function as position markers. In other words, the second to fifth optical fibers 42 to 45 constituting the position markers have mutually different Brillouin spectrum values and, therefore, function as clearer position markers.

Namely, the measurement position can be clarified by comparing the result of measurement of the distribution in the longitudinal direction of the parameter of the Brillouin spectrum measured by the finder 25 and the actual position in which the second optical fibers 42 are installed. The Brillouin spectrum of the first optical fibers 41 and Brillouin spectrum of the second optical fibers 42 change in accordance with the variation in the physical amount of the measurement target (temperature variation/applied strain) and, therefore, the temperature and strain distributions in the longitudinal direction of the optical fiber section 30e can be measured without disconnecting the inserted parts of the second optical fibers 42.

Third Embodiment

The Brillouin spectrum measuring apparatus according to the third embodiment has the same structure as that of the Brillouin spectrum measuring apparatus 2 according to the second embodiment. However, the optical fiber section 30f applied to the Brillouin spectrum measuring apparatus according to the third embodiment comprises first to third optical fibers 41 to 43 as shown in FIG. 20. FIG. 20 serves to illustrate the structure of the optical fiber section as part of the Brillouin spectrum measuring apparatus according to the third embodiment. The area (a) of FIG. 20 shows the constitution of the optical fiber section 30f and the Brillouin spectra of the first to third optical fibers 41 to 43. The area (b) of FIG. 20 is a Brillouin spectrum of the optical fiber section 30f. The area (c) of FIG. 20 represents the temperature distribution or strain distribution of the optical fiber section 30f analyzed on the basis of the Brillouin spectrum of the first to third optical fibers 41 to 43.

The optical fiber section 30f has a structure in which first to third optical fibers 41 to 43 with the same length are serially connected in order. Further, the difference between the peak frequencies of the respective Brillouin spectra of the first to third optical fibers 41 to 43 in a predetermined temperature range and predetermined strain application range is equal to or more than the peak line widths of the respective Brillouin spectra.

That is, the maximum value of the peak frequency $v_{B1}$ of the Brillouin spectrum of the first optical fiber 41 is smaller than the minimum value of the peak frequency $v_{B2}$ of the Brillouin spectrum of the second optical fiber 42 in a predetermined temperature range and predetermined strain application range. The maximum value of the peak frequency $v_{B2}$ of the Brillouin spectrum of second optical fiber 42 in a predetermined temperature range and predetermined strain application range is smaller than the minimum value of the peak frequency $v_{B3}$ of the Brillouin spectrum of the third optical fiber 43.

The difference between the maximum value of the peak frequency $v_{B1}$ of the Brillouin spectrum of the first optical fiber 41 and the minimum value of the peak frequency $v_{B2}$ of the Brillouin spectrum of the second optical fiber 42 in a predetermined temperature range and predetermined strain application range is equal to or more than the line widths of the Brillouin spectra of the first optical fiber 41 and second optical fiber 42. In addition, the difference between the maximum value of the peak frequency $v_{B2}$ of the Brillouin spectrum of the second optical fiber 42 and the minimum value of the peak frequency $v_{B3}$ of the Brillouin spectrum of the third optical fiber 43 is equal to or more than the line widths of the Brillouin spectra of the second optical fiber 42 and third optical fiber 43.

In the third embodiment, the finder 25 detects distribution of the Brillouin spectrum of the optical fiber section 30f by measuring the Brillouin spectrum of the whole optical fiber section 30f without using the distribution measurement technology such as BOTDR, BOTDA, BOCDA and so forth. The Brillouin spectrum from the optical fiber section 30f detected by the finder 25 comprises the Brillouin spectra B1, B2, and B3 as shown in the area (b) of FIG. 20 and the difference between the peak frequencies of the respective Brillouin spectra is equal to or more than the peak line widths of the respective Brillouin spectra.

The discrimination section 27 discriminates each of the Brillouin spectrum B1 of the first optical fiber 41, the Brillouin spectrum B2 of the second optical fiber 42, and the Brillouin spectrum of the third optical fiber 43 on the basis of the Brillouin spectrum B3 from the optical fiber section 30f detected by the finder 25 (confirms the points of connection between the first to third optical fibers 41, 42, 43 based on the measurement data).

The distribution measurement section 29 (distribution determination means) measures the temperature or strain of the first optical fiber 41 on the basis of the parameter of the Brillouin spectrum B1 of the first optical fiber 41 discriminated by the discrimination section 27. In addition, the distribution measurement section 29 measures the temperature or strain of the second optical fiber 42 on the basis of the parameter of the Brillouin spectrum B2 of the second optical fiber 42 discriminated by the discrimination section 27. Moreover, the distribution measurement section 29 measures the temperature or strain of the third optical fiber 43 on the basis of the parameter of the Brillouin spectrum B3 of the third optical fiber 43 discriminated by the discrimination section 27.

In other words, the distribution measurement section 29 is able to measure the temperature distribution or strain distribution in the longitudinal direction of the optical fiber section 30f as in the area (c) of FIG. 20 by integrating the respective temperature or strain information of the first to third optical fibers 41 to 43. In the third embodiment, the length of the first to third optical fibers 41 to 43 corresponds to the axial resolution. In addition, the number of optical fibers applied to the optical fiber section 30f is not limited to three and may be a greater number.

From the invention thus described, it will be obvious that the embodiments of the invention may be varied in many ways. Such variations are not to be regarded as a departure from the scope of the invention, and all such modifications as would be obvious to one skilled in the art are intended for inclusion within the scope of the following claims.

INDUSTRIAL APPLICABILITY

The measuring method and measuring apparatus of the Brillouin spectrum according to the present invention can be utilized for strain sensing technology for which optical fiber is employed and the modification of various structures that utilize Brillouin scattered light as well as applications to systems for measuring/sensing the ambient temperature are possible.

The invention claimed is:

1. A Brillouin spectrum measuring method of measuring a physical amount relating to a measurement target, by utilizing a Brillouin spectrum as a spectrum of Brillouin scattered light that is generated in accordance with an input of pumping light with a predetermined wavelength from inside an optical fiber installed in the vicinity of the measurement target, said method comprising the steps of:

preparing an optical fiber section including a first optical fiber and a second optical fiber for which the difference between the peak frequencies of the Brillouin spectra obtained in a predetermined temperature and predetermined strain-applied state for which the respective usage environments are assumed is equal to or more than a predetermined frequency difference, said first and second optical fibers being serially connected via a connection portion;

measuring the Brillouin spectrum obtained in accordance with the pump light that is supplied to said optical fiber section; and confirming the point of connection between said first and second optical fibers on the basis of measurement data for the measured Brillouin spectrum.

2. A Brillouin spectrum measuring method according to claim 1, wherein said first and second optical fibers have Brillouin spectra in which the line width parts of the peaks of the Brillouin spectra do not overlap one another in a predetermined temperature range and in a predetermined strain-applied state for which the respective usage environments are assumed.

3. A Brillouin spectrum measuring method according to claim 1, wherein said first and second optical fibers are mechanically connected.

4. A Brillouin spectrum measuring method according to claim 1, wherein the connection portion between said first and second optical fibers is installed at the boundary between a measurement area of the measurement target and a non-measurement area other than the measurement area.

5. A Brillouin spectrum measuring method according to claim 4, wherein, of said first and second optical fibers, one installed in the non-measurement area includes an optical fiber with a low Brillouin spectrum sensitivity with respect to strain or temperature.

6. A Brillouin spectrum measuring method according to claim 4, wherein at least one of said first and second optical fibers includes a plurality of optical fiber elements, and said optical fiber section has a structure in which the optical fiber elements belonging to said first optical fiber and the optical fiber elements belonging to said second optical fiber are arranged alternately, and wherein the connection points between the optical fiber elements belonging to said first optical fiber and the optical fiber elements belonging to said second optical fiber, which are located within said optical fiber section, are utilized as markers in the Brillouin spectrum measurement.

7. A Brillouin spectrum measuring apparatus for measuring a physical amount relating to a measurement target, by utilizing a Brillouin spectrum as a spectrum of Brillouin scattered light that is generated in accordance with an input of pumping light with a predetermined wavelength from inside an optical fiber installed in the vicinity of the measurement target, comprising:

an optical fiber section including a first optical fiber and a second optical fiber serially connected to said first optical fiber via a connection portion;

detection means for detecting, while supplying pumping light for obtaining a Brillouin spectrum to said optical fiber section, a Brillouin spectrum obtained from said optical fiber section in accordance with the supply of the pumping light; and a position measurement section specifying the position of the connection portion between said first and second optical fibers on the basis of the detected Brillouin spectrum.

8. A Brillouin spectrum measuring apparatus according to claim 7, wherein the connection portion includes a connection mechanism for mechanically connecting said first and second optical fibers.

9. A Brillouin spectrum measuring apparatus according to claim 7, wherein said first and second optical fibers have Brillouin spectra of mutually different peak frequencies.

10. A Brillouin spectrum measuring apparatus according to claim 7, wherein said first optical fiber includes a pure silica core optical fiber, and said second optical fiber includes an optical fiber whose core has a relative refractive index difference of 0.083% or more with respect to pure silica.

11. A Brillouin spectrum measuring apparatus according to claim 7, further comprising: a calculation section calculating the temperature distribution or strain distribution of the measurement target on the basis of the detected Brillouin spectrum.

* * * * *